(12) United States Patent
Prenzel et al.

(10) Patent No.: US 8,969,479 B2
(45) Date of Patent: Mar. 3, 2015

(54) PRESSURE-SENSITIVE ADHESIVES AND PROCESS FOR PREPARING THEM

(75) Inventors: Alexander Prenzel, Hamburg (DE); Jennifer Beschmann, Hamburg (DE)

(73) Assignee: tesa SE, Hamburg (DE)

( * ) Notice: Subject to any disclaimer, the term of this patent is extended or adjusted under 35 U.S.C. 154(b) by 959 days.

(21) Appl. No.: 12/256,715

(22) Filed: Oct. 23, 2008

(65) Prior Publication Data

US 2010/0010112 A1 Jan. 14, 2010

(30) Foreign Application Priority Data

Jul. 11, 2008 (DE) .......................... 10 2008 032 571

(51) Int. Cl.
*C09J 133/08* (2006.01)

(52) U.S. Cl.
CPC .................................... *C09J 133/08* (2013.01)
USPC ............. 525/190; 525/63; 525/251; 523/216; 523/300; 524/522; 522/86

(58) Field of Classification Search
CPC ........ C09J 133/08; C09J 201/02; C09J 11/04; C09J 201/10
USPC ............. 525/63, 190, 251; 523/216; 524/522; 522/86
See application file for complete search history.

(56) References Cited

U.S. PATENT DOCUMENTS 4,710,536 A 12/1987 Klingen et al.
5,296,530 A * 3/1994 Bors et al. ..................... 524/558

(Continued)

FOREIGN PATENT DOCUMENTS

| DE | 100 15 981 | 10/2001 |
|----|------------|---------|
| DE | 101 48 731 | 4/2003 |

(Continued)

OTHER PUBLICATIONS

EPO search report in corresponding application 09164741.2.*

(Continued)

*Primary Examiner* — Mark Kaucher
(74) *Attorney, Agent, or Firm* — Norris McLaughlin & Marcus, P.A.

(57) ABSTRACT

The invention relates to a process for preparing a dispersion-based or hotmelt pressure-sensitive adhesive based on at least one polymer, which involves crosslinking the at least one polymer, the polymer having functional groups Y, the polymer additionally being admixed with at least one kind of functionalized particles which have at least one polymeric base unit, characterized in that the particles have a monomer as base unit, the monomer having at least one kind of functional groups Z which are not able to enter into any reaction with the functional group Y and which, by thermal energy, electromagnetic radiation, particulate radiation and/or sound energy, are converted into the group X, the crosslinking of the polymer being brought about at least in part by a reaction of the functional groups X of the particles and of the functional groups Y of the polymer, and additionally to pressure-sensitive adhesives based on at least one crosslinked polymer component, wherein the crosslinking of the polymer component is brought about at least partly through incorporation of functionalized particles, the particles having at least one polymeric base unit and also a monomer with one kind of functional groups Z, these groups Z, following conversion into the groups X by means of thermal energy, electromagnetic radiation, particulate radiation and/or sound energy, being capable of reacting with functional groups Y that are present in the polymer component, and also to the use of surface-modified functionalized particles having a polymeric base unit as crosslinking reagents for the crosslinking of polymers for preparing pressure-sensitive adhesives.

15 Claims, 6 Drawing Sheets

(56) References Cited

U.S. PATENT DOCUMENTS

| | | | |
|---|---|---|---|
| 5,510,443 | A | 4/1996 | Shaffer et al. |
| 6,114,493 | A | 9/2000 | Scialdone |
| 6,147,159 | A | 11/2000 | Hu et al. |
| 6,168,913 | B1 | 1/2001 | Hochlowski et al. |
| 6,319,992 | B1 * | 11/2001 | Mueller et al. ............. 525/301 |
| 6,417,267 | B1 | 7/2002 | Stockl et al. |
| 6,989,192 | B2 | 1/2006 | Husemann et al. |
| 8,536,276 | B2 * | 9/2013 | Prenzel et al. ............. 525/251 |
| 2003/0068492 | A1 * | 4/2003 | Husemann et al. ..... 428/355 AC |
| 2005/0129936 | A1 | 6/2005 | Husemann et al. |
| 2006/0035087 | A1 | 2/2006 | Yadav et al. |
| 2006/0204528 | A1 | 9/2006 | Nolte et al. |
| 2006/0205835 | A1 | 9/2006 | Husemann et al. |
| 2006/0257650 | A1 * | 11/2006 | Dollase et al. ............ 428/355 R |
| 2007/0267133 | A1 | 11/2007 | Matano et al. |

FOREIGN PATENT DOCUMENTS

| | | |
|---|---|---|
| DE | 10 2005 022 782 | 11/2006 |
| EP | 1 083 204 | 8/2000 |
| EP | 1300455 A2 | 4/2003 |
| EP | 153 21 82 | 4/2004 |
| EP | 1 676 870 | 12/2005 |
| JP | 8 053596 | 2/1996 |
| WO | 2006 029407 | 3/2006 |
| WO | 2007024838 | 3/2007 |

OTHER PUBLICATIONS

Suslick "The Chemistry of Ultrasound" The Yearbook of Science & the Future 1994;Encyclopaedia Britannica: Chicago, 1994; pp. 138-155.*

Heinrich, et al, Adv. Polym. Sci. 202, 160, pp. 1-44.

Pahl et al, Praktische Rheologie der Kunststoffe and Elastomere, 4th Ed. 1995, VDI Verlag, Dusseldorf, p. 191.

Tanner et al, Engineering Rheology 2nd Ed. 2000, Oxford University Press, Oxford, p. 523f.

Kirsch et al, J. Appl. Pol. Sci. 2006, 101, pp. 1444-1455.

McGinniss et al, Encyclopedia of Polymer Science and Engineering, 2nd ed., 1986, Wiley, New York, vol. 4, p. 418ff.

Flint, et al; Science, vol. 253, 1991, p. 139ff.

Gleißle, Rheol. Acta, 1982, 21, p. 484-487.

Lovell, et al; Emulsion Polymerization and Emulsion Polymers, 1997, John Wiley & Sons, Chichester.

Greene et al; Protective Groups in Organic Synthesis, 3rd Edition, John Wiley & Sons, Inc., New York 1999.

Philip, et al; Angew Chem 1996, 108, pp. 1242-1286.

Schmuck, Angew, Chem 2002, 113, pp. 4493-4499.

Rehahn, Acta Polym., 1998, 49, pp. 201-224.

Lohmeijer, et al, J. Polym. Sci. A Polym. Chem., 2003, 41, pp. 1413-1427.

* cited by examiner 7.1  7.2  7.3

7.4  7.5  7.6

PRESSURE-SENSITIVE ADHESIVES AND PROCESS FOR PREPARING THEM

The present invention relates to pressure-sensitive adhesives which preferentially are present as an aqueous system (dispersion or emulsion adhesives) and/or to pressure-sensitive adhesives which can be processed without solvent (hotmelt pressure-sensitive adhesives). The pressure-sensitive adhesives of the invention are distinguished not only by good processing properties and, in particular, coatability but also by good product properties. The invention embraces the composition of innovative pressure-sensitive adhesive formulations and also their preparation, processing, and use in self-adhesive products. Also part of this invention is an innovative scheme allowing the combination of good processing properties and good product properties to be realized for pressure-sensitive adhesive formulations of this kind.

PRIOR ART

Within the field of adhesives, pressure-sensitive adhesives (PSAs) are notable in particular for their permanent tack. A material which has permanent tack must at any given point in time have an appropriate combination of adhesive and cohesive properties. This distinguishes it, for example, from reactive adhesives, which in the unreacted state offer virtually no cohesion. For good product properties it is appropriate to adjust PSAs in such a way that the balance of adhesive and cohesive properties is at an optimum. This balance is typically achieved by converting polymer chains present in PSA formulations into wide-meshed networks. The nature of this network has a critical influence on the adhesive and cohesive properties of the PSA. A material featuring pronounced crosslinking, although having good cohesion, nevertheless has reduced pliancy, so that the material is unable to adapt adequately to the roughness of a substrate surface. Moreover, a material featuring pronounced crosslinking has only a relatively low ability to dissipate deformation energy such as occurs under load. Both phenomena reduce the bond strength. A material with a low level of crosslinking, in contrast, although able to flow on rough surfaces and to dissipate deformation energy, with the consequence that the adhesion requirements may be met, is nevertheless inadequate in its resistance to load, owing to a reduced cohesion.

One kind of crosslinking which has an effect on the adhesion/cohesion balance is temporary polymer-chain interlooping. However, this is sufficient for adequate cohesion of the PSA only when the molar mass of the polymers is sufficiently high. PSAs based on natural rubbers may rest solely on this crosslinking principle. Further possibilities of setting the crosslinking of the PSA are chemical crosslinks, which are therefore irreversible. Chemical crosslinking can also be achieved by means of radiation treatment of the PSAs. Another possibility is to utilize physical crosslinking principles. Examples of such crosslinks, typically thermoreversible, in PSAs are present in thermoplastic elastomers, such as in certain block copolymers or semicrystalline polymers.

Besides the crosslinking principles referred to, it is also possible to use fillers for raising the cohesion. In that case a combination of filler/filler interactions and filler/polymer interactions frequently leads to the desired reinforcement of the polymer matrix. A raising of cohesion based thereon represents a further physical crosslinking variety.

For fillers which are mentioned with a view to a reinforcing effect in PSAs, the class of the pyrogenic (or fumed) silicas deserves particular mention. These silicas are used, inter alia, as thickeners, gelling agents or thixotropic agents in a very wide variety of fluids, utilizing their effect on the rheological properties of the fluids. The use of hydrophilic and of hydrophobic silica is described in this context. Examples of the use of pyrogenic silica in the field of PSAs are described in US 20060205835 by tesa AG, in U.S. Pat. No. 4,710,536 by 3M and in EP 108 32 04 B1 by Dow Corning.

As further examples of water-based adhesives, US 20070267133 A1 by Lintec Corp. and DE 10015981 A1 by tesa AG have described the use of organic fillers, in dispersion in water, for the purpose of improving the product properties. However, it must be ensured that the stability of the dispersion-based adhesive is unaffected by the addition of fillers, and that no agglomeration or flocculation of the latex particles occurs, which would make the adhesives unprocessable.

In all of these cases the reinforcement results from the effect of the particles on the elasticity modulus of the elastomer composite. The interaction in this case is brought about by physical interactions between individual particles, on the one hand, and between particles and polymers, on the other. Often, however, these physical interactions are not enough to withstand even low mechanical deformations, such as may occur, for example, when a PSA joint is loaded by shearing or peeling. This nonlinear phenomenon is known as the Payne effect and is manifested as a loss of elasticity modulus under deformation. A review of the description of this effect and of various approaches as a mechanistic explanation is given by Heinrich and Klüppel [G. Heinrich, M. Klüppel, *Adv. Polym. Sci.*, 2002, 160, 1-44].

In the preceding section, a variety of examples have been given of types of crosslinking that may be employed in PSAs for improving the product properties, especially the cohesion. For each of these varieties of crosslinking, the question arises of to what extent they affect the processing properties, and more particularly the coating characteristics. This is debated below.

Besides the product properties and hence the optimum balance of adhesive and cohesive properties in a PSA, its processing properties are also of central importance. Generally speaking, the processing properties of a formulation are reduced by its crosslinking. In a majority of cases indeed, processing becomes impossible. It is therefore advantageous to carry out or to initiate crosslinking not until during or after processing, and in particular during or after coating. However, where the crosslinking state results from the mere presence of a constituent in the formulation, as is the case with the abovementioned fillers, then the processing characteristics are adversely affected by its very presence. Polymers with high molar masses are likewise among formulation constituents which by virtue of their state of interlooping have advantageous product properties and yet, likewise owing to their state of interlooping, may show disadvantages in processing properties. In both cases, namely both interlooping and fillers, the physical principles which lead to the crosslinking of the PSA system and hence to advantageous product properties have negative consequences for the processing characteristics, particularly the coatability.

Traditional approaches to escaping this dilemma have been based on the use of solvents as operating assistants. An increased environmental awareness and the desire for evermore efficient production techniques, however, are underlying the trend toward solvent-free operations (aqueous or hotmelt systems). In comparison to solvent processing methods, the polymer-based PSA base compositions, in the case of the hotmelt processes have a state of crosslinking in their melt, as a result of the interlooping and/or filler particles, which is associated with significantly higher viscosities and elasticities. In the case of polymer dispersions, fillers tend to lead to instability of the dispersion, and yet the above-described effects may occur during drying and hence likewise the processability may be affected, or may lead to a deficient coating outcome owing to impaired mobility of the polymers, which in the case of emulsion polymerization have particularly high molar masses.

In contrast to physical modes of crosslinking, chemical crosslinking methods afford the formation of a network which can be initiated by an appropriate operating regime only during processing. However, the use of chemical crosslinkers is limited by their pot-life reactivity. If the network forms in too pronounced a way before the material has been coated, the elasticity increase which has already taken place results in a deterioration in the processing properties, and reduced-quality coating outcomes may result.

In the case of the dispersion-based adhesives, a difficulty which arises is that the chemical crosslinker must not react with the continuous phase, the water, since otherwise it is no longer capable of crosslinking of the polymer. One way to get around this is through the use of specific monomers and of crosslinking systems tailored to them, which react very selectively, as described in U.S. Pat. No. 6,417,267 B1 by Eastman Chemical Company. Another way, as in JP 8053596 A from Soken Kagaku, is the use of molecules having blocked functionalities. Moreover, in WO 2006029407 A2, Corium International Inc. has described the use of reactive polymer blends with low glass transition temperatures, which react with one another only when the water is removed, during the phase of film formation. It can therefore be assumed that such systems have only a limited pot life, since the contact between two complementary latex particles can lead to a reaction and hence the dispersion becomes unstable as a result of the agglomerates.

Another particular difficulty arises in the case of solvent-free systems, since, here, elevated temperatures are necessary for processing, leading at the same time to an acceleration of the chemical crosslinking reaction. One example of a system of this kind is described in US 20050129936 A1 by tesa A G. Radiation crosslinking methods appear advantageous in this context, since only after coating is the formation of a network initiated deliberately, as proposed for example in EP 153 21 82 A1 by tesa AG and EP 167 68 70 A1 by National Starch. However, in order to obtain networks having a structure satisfying the subsequent product requirements in respect of shear strength, polymers of decidedly high molar mass are needed, which in turn, as a result of their state of interlooping, may have disadvantages in terms of processing characteristics.

Typically, the processing properties of a material deteriorate as its elasticity goes up. Formation of a network always leads to an increase in the storage modulus and hence to upper elasticity. Consequently, there is a deterioration in the fluidity, which is needed for processing of the coating, or even a complete loss of fluidity. In the case of coating, then, inhomogeneities may occur in the coating outcome, possibly going as far as melt fracture. A variety of authors describe this phenomena, especially for capillary dies and extrusion dies. Literature references on this can be found in Pahl et al. [M. Pahl, W. GleiBle, H.-M. Laun, Praktische Rheologie der Kunststoffe und Elastomere, 4th ed., 1995, VDI Verlag, Düsseldorf, p. 191f] and Tanner [R. I. Tanner, Engineering Rheology, 2nd ed., 2000, Oxford University Press, Oxford, p. 523f].

Systems are therefore sought which preferably can be coated from dispersion and/or without solvent and which exhibit a combination of good product properties on the one hand—and here particularly in respect of cohesion—and improved processing properties on the other, especially coatability.

One particularly advantageous example of systems which at least partly satisfy this combination of requirements is represented by block copolymers comprising segments which soften at high temperatures (known as the hard phase) and others which at application temperature are present in melted form. The softening temperature of the hard phase is typically adjusted, through the use of specific monomers, such that good product properties prevail at room temperature and yet at temperatures that are rational from an operational standpoint the material can easily be coated from the melt. Since these materials typically do not have high molar masses, their melt viscosity and elasticity, as soon as the hard phase is in softened form, are comparatively low.

A disadvantage of the above-discussed PSAs based on block copolymers, however, is their thermal shear strength, which is limited by the softening of the hard domains that sets in at an elevated temperature. A further disadvantage to be cited are the costly and inconvenient preparation conditions for block copolymers. In order to be able to prepare polymers having the requisite block like structure in sufficient quality, controlled or living polymerization techniques are necessary, some of which are complex. Moreover, not all monomer combinations can always be easily realized. Hence the block copolymer approach, on the one hand, therefore, is seen as not being universally flexible for numerous polymer systems. On the other hand there is a need for PSAs having better thermal shear strength.

A similar approach was pursued by S. Kirsch et al. with the use of latex particles having a special morphology [S. Kirsch, M. Kutschera, N.-Y. Choi, T. Frechen, *J. Appl. Pol. Sci.* 2006, 101, 1444-1455]. As a seed, a polymer having a low glass transition temperature was chosen which, following film formation, critically determines the adhesive properties. Subsequently a next stage was polymerized onto the seed particles, this polymer on the one hand having a high glass transition temperature and contributing, through the formation of crystalline domains as in the case of the block copolymers, to the cohesion, and on the other hand, owing to phase incompatibilities, not completely enveloping the seed, as shell, but instead forming small domains. It has been found that no significant increase could be achieved in the cohesion, including—and in particular—at higher temperatures.

Surface-functionalized fillers, more particularly the classes of the fumed and precipitated silicas, are likewise described in US 2006/0035087 A1 from NanoProducts Corp., US 2006/0204528 A1 from Byk-Chemie GmbH, and WO 2007/024838 from E. I. du Pont de Nemours and Co., for the purpose of constructing a chemical network. Crosslinking in this case takes place through the formation of covalent bonds, the crosslinking reactions being initiated thermally. This in turn may be problematic in the context of the incorporation of the fillers and also of the processing of the composites, since, owing to elevated temperatures, crosslinking may begin as early as in the operation. DE 10 2005 022 782 A1 from tesa AG describes functionalized particles which, under the action of electromagnetic radiation and/or particulate radiation, lead to crosslinking of the pressure-sensitive adhesive; however, there continues to be a need for thermally initiable crosslinking methods for pressure-sensitive adhesives which can nevertheless be processed in a hotmelt process.

Functionalized organic particles, in contrast, are used in combinatorial chemistry and in biochemistry; merely as examples, we cite here the patents U.S. Pat. No. 6,168,913 and the references and patents quoted therein, and also the patents U.S. Pat. Nos. 6,147,159 and 6,114,493. DE 10148731 A1 used functionalized latex particles as reactive fillers for pressure-sensitive adhesives which, forming covalent bonds with the polymer matrix, contribute to the crosslinking, in solvent-based pressure-sensitive adhesives. Owing to the reactive groups, however, they cannot be used in dispersion-based adhesives, and can be used only with difficulty in solvent-free systems, since either the stability of the dispersion is impaired by agglomeration or there is gelling of the adhesives during the hotmelt operation.

It has now been found, surprisingly for the skilled worker, that particles of this kind, developed especially for combinatorial chemistry, are outstandingly suitable for the thermal crosslinking of dispersion-based adhesives and/or acrylate hotmelts, when the functionalities that are needed to form the covalent bond are blocked or protected, and the particles, owing to the small size, have a suitable specific surface (ratio of surface area to volume). Moreover it has been found, surprisingly, that in addition the glass transition temperature of the organic particles plays a large part, since as well as the thermal crosslinking the particle structure specifically also brings about a rise in the cohesive properties.

PROBLEM

It is therefore an objective of the present invention to provide a flexible scheme which encompasses a suitable combination of material and process so that it is possible to prepare PSAs which can preferably be processed without dispersion and/or solvent and which have good processing properties such as, for example, an increased pot time for the crosslinking reaction and good product properties.

As has now been found, this combination of requirements, consisting of good processing properties and good product properties, can be obtained by preparing crosslinked PSAs using a process in which a specific PSA formulation comprises organic particles (latex particles) with blocked and/or deactivated functionalities, said particles being functionalized in such a way that, during or after the coating operation, the particles can be linked to at least one kind of polymeric constituents of the PSA formulation by exposure to, in particular, thermal energy and/or radiation energy, in particular to electromagnetic radiation or particulate radiation and/or to sound energy.

DESCRIPTION

Brief Description of the Drawings

The present invention relates to a process for preparing a crosslinked pressure-sensitive adhesive, to crosslinked pressure-sensitive adhesives obtainable by such a process, and to the use of such adhesives. The invention further embraces intermediates from such a process, particularly the composition of innovative formulations for pressure-sensitive adhesives. The combination of the innovative PSA formulations of the invention with the preparation process of the invention is likewise inventive and a central component of this specification (in this regard cf. also FIG. 1). FIG. 1 shows the fundamental principle of how a pressure-sensitive adhesive formulation is reacted by means of a modified filler, via an operation which includes, in particular, compounding, the coating of the adhesive onto a carrier, and the subsequent crosslinking of the adhesive, to form a crosslinked pressure-sensitive adhesive.

Figure 1:
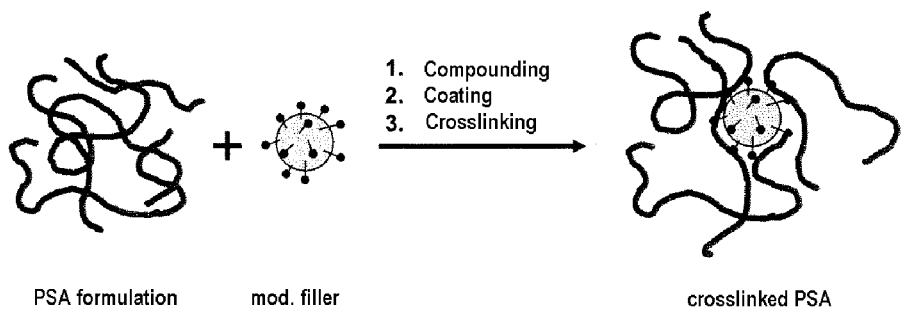
FIG. 1 illustrates the reaction of a pressure-sensitive adhesive formulation by means of a modified filler.

The invention provides a process for preparing a dispersion-based or hotmelt pressure-sensitive adhesive comprising the crosslinking product of at least one polymer and at least one kind of functionalized particles, the polymer having reactive centers, the functionalized particles having at least one polymeric base unit, the polymeric base unit based on monomers comprising at least one monomer kind whose monomers have at least one kind of functional groups Z which, under the conditions of the preparation and processing of the polymer and/or of the noncrosslinked pressure-sensitive adhesive, do not enter into any reaction with the reactive centers of the polymer, characterized in that the process comprises the following steps:

converting at least some of the functional groups Z of the particles, by supply of energy, into functional groups X which are capable, under appropriate process conditions, of entering into a reaction with the reactive centers of the polymer, forming the crosslinking product, comprising reacting the functional groups X of the particles with the reactive centers of the polymer under the appropriate process conditions.

In a particularly preferred procedure, the energy supplied is thermal energy, electromagnetic radiation, particulate radiation and/or sound energy.

In one very advantageous embodiment of the process the reactive centers are functional groups Y.

The invention accordingly relates to a process for preparing a pressure-sensitive adhesive based on at least one polymer A, in the course of which said at least one polymer A is crosslinked, it being possible for the polymer to have functional groups Y and having been admixed, further, with at least one kind of functionalized particles B (also called "filler particles" below). The particles have at least one polymeric base unit with at least one kind of functional groups Z, which are protected or blocked groups X and which are converted into the group X (see FIG. 2: deprotection or deblocking of the group Z to form the group X) only by means of external stimuli (e.g., temperature, actinic radiation, ultrasound) by decomposition, dissociation (homolytic or heterolytic) or other chemical reactions. In accordance with the invention the crosslinking of the polymer is brought about at least in part by a reaction of the functional groups X of the particles and the polymer, it being possible for the latter to comprise functional groups Y. The group Z per se is not conducive to crosslinking with the polymer A and must therefore be transformed first of all into group X. Within the sense of the invention the crosslinking may also be brought about completely by means of the functionalized particles.

The dependent claims relate to advantageous versions of the process of the invention.

The invention further provides a pressure-sensitive adhesive based on at least one crosslinked polymer component A, the crosslinking of the polymer component A being brought about at least in part by incorporation of functionalized particles B, the particles B having at least one polymeric base unit, the polymer having at least one kind of a monomer with a blocked or protected functional group X which, after activation, is capable of reacting with polymer component A, it being possible for functional groups Y to be present in the polymer component A.

A pressure-sensitive adhesive of this kind is to be presented as being in accordance with the invention particularly if it is obtainable by the processes described as being in accordance with the invention.

The invention additionally provides for the use of functionalized organic particles having a polymeric base unit, particularly of particles of the kind described in the context of this specification, as crosslinking reagents of polymers for preparing pressure-sensitive adhesives.

Also considered as being in accordance with the invention are the polymers A which have as yet not been crosslinked but have been admixed with the functionalized particles B. In the pressure-sensitive adhesive to be crosslinked there may be further components present.

Figure 3:
FIG. 3 illustrates the formation of a bond between functional group X and functional group Y

The PSA formulations of the invention comprise at least one kind of a polymer A which may contain at least one kind of groups of type Y, and also at least one kind of filler particles B containing on their surface at least one kind of groups of type X which originates, as a result of activation, from a group of type Z which is not suitable for crosslinking. The group of type Z has been selected for the purposes of the invention such that the group of type X is generated therefrom by exposure to thermal energy, electromagnetic radiation, particulate radiation and/or sound energy, which group of type X is formed in turn independently or in combination with the protection or conversion of group Z and also that exposure to electromagnetic radiation, particulate radiation and/or sound energy forms a bond between the polymer and at least one functional group of type X and/or at least one group in the polymer of type Y and at least one functional group of type X, thereby producing an adduct of type B—X'-A (reaction with reactive center) and/or B—X'-Y'-A (reaction with functional group Y) (see FIG. 3). The designation X' here denotes that the structure of the functional group X may have altered following reaction. Similarly, the designation Y' indicates that the structure of the functional group Y may have altered following reaction. It is likewise in accordance with the invention for the functional groups X and Y not to have altered in their structure and yet still to have entered into a linkage.

In this description the terms "electromagnetic radiation" and "particulate radiation" are to be understood to mean all forms of radiation, a summary having been given by V. D. McGinniss [V. D. McGinniss in Encyclopedia of Polymer Science and Engineering, H. F. Mark, N. M. Bikales, C. G. Overberger, G. Menges (eds.), 2nd ed., 1986, Wiley, New York, vol. 4, p. 418ff]. The skilled worker is aware of further kinds of radiation which may likewise be inventively employed. The use of sound energy, more particularly ultrasound, in chemical reactions is likewise becoming ever more important and finds use in practice [E. B. Flint, K. S. Suslick; *Science* 1991, 253, 1397ff]. The use of thermal energy is preferably employable in accordance with the invention.

Through the inventive use of the innovative formulations described here, in combination with the process described here, advantageously crosslinked PSAs are obtained. The functionalized filler particles B act as polyfunctional crosslinkers [cf. DE 10 2005 022 782 A]. As a result of their capacity to link two or more polymer chains in one crosslinking point it is possible to reduce the molar mass of the polymeric constituents of the PSA that are to be crosslinked (on the basis of polymeric constituents for the PSA which—in relation to customary, prior-art processes—have a reduced molar mass). There follows an improvement in the processing characteristics. Conversely, within the context of this invention, it is also possible to admix the filler particles of the invention to PSAs which comprise crosslinkable polymers of low molar mass. Following exposure to thermal energy, electromagnetic radiation, particulate radiation and/or sound energy, different network structures are obtained than if the filler particles of the invention had not been present. A feature of this innovative state of crosslinking is that it correlates with improved product properties, particularly an increased cohesion of the PSA. Typically it is characteristic of the innovative state of crosslinking that the adhesive properties of the PSAs of the invention are at least at the level also occupied by a crosslinked PSA which contains no inventive filler particles but has been processed in a comparable way and has a comparable gel fraction.

An advantageous approach is for the PSA formulations of the invention, comprising at least one kind of an inventive polymer A and at least one kind of a functionalized filler particle B, to have good processing properties in the raw state—that is, before processing commences. By processing properties for the purposes of this invention are meant in particular the viscosity of the PSA formulation and also its elasticity. The viscosity is reported as zero-shear viscosity $\eta_0$ for different temperatures. It can be obtained from viscosity curves determined by capillary viscosymmetry. The elasticity is reported in the form of the first normal stress difference $N_1$, again at different temperatures. The data for the first normal stress difference, too, can be obtained from capillary viscosymmetry experiments. Both variables, the viscosity and the first normal stress difference, are generally dependent on shear rates for PSA formulations. Depending on process and the shear rates which occur therein, therefore, they may vary for a given PSA formulation. For the description of this invention it is sensible to limit oneself to one shear rate; however, this does not restrict in this respect the processes which can be used in accordance with the invention. As one such shear rate the shear rate of $1000 \text{ s}^{-1}$ is selected as a representative, advantageous value. For the processing properties and particularly the coatability it is very advantageous not to exceed a defined ratio of elasticity and viscosity at the shear rate dictated by the process. If this ratio is too high, the elastic character of the material to be coated is predominant. A consequence of that can be melt fracture, which is manifested in a non-homogeneous coating pattern (M. Pahl, W. Gleiẞle, H.-M. Laun, Praktische Rheologie der Kunststoffe und Elastomere, 4th ed., 1995, VDI Verlag, Düsseldorf, p. 191f).

In accordance with information gained from capillary-viscosimetric rheology, the ratio $R = N_1/\tau$ of first normal stress difference $N_1$ and shear stress $\tau$ determines the processing characteristics of a polymer melt [W. Gleiẞle, *Rheol. Acta,* 1982, 21, 484-487; M. Pahl, W. Gleiẞle, H.-M. Laun, Praktische Rheologie der Kunststoffe und Elastomere, 4th ed., 1995, VDI Verlag, Düsseldorf, p. 320ff]. The shear stress $\tau$ is the product of viscosity and shear rate. The numerator of the ratio $N_1/\tau$ hence describes the elastic properties of the material, the denominator the viscous properties. The latter, moreover, illustrates the dependence on the operating speed in the form of the shear rate. Above a critical rate for R, flow anomalies occur. If, therefore, at the shear rates which prevail during processing, success is achieved in reducing $N_1$ by a design of material, or at least in not causing it to grow further as a result of additional crosslinking effects, the expectation is then that the material will be able to be coated without melt inhomogeneities. This can be accomplished, for example, by not initiating crosslinking until after coating, such as is possible, for example, in the case of radiation treatment. The irradiated and thus crosslinked material has an increased elasticity and, in association with this, a higher first normal stress difference, and in this state could not be processed with a good coating pattern. The uncrosslinked melt, however, is less elastic, exhibits a lower first normal stress difference, and can be coated successfully. For PSAs with good cohesion there is frequently a need for polymers having high molar masses. These polymers, however, may have high elasticities even in the chemically uncrosslinked state, owing to intermolecular interactions, such as interlooping, and this may lead to disadvantages in the coating characteristics.

The innovative invention follows the concept of accomplishing the cohesion of the PSA of the invention essentially by means of an improved state of crosslinking via chemical linking of polymers to filler surfaces. A high polymer molar mass is therefore no longer mandatory and, consequently, the coating characteristics are not so pronouncedly restricted as a result of chain interlooping. The particles themselves, during processing, are in the form of a disperse phase in the PSA formulation. Since at this time they have not yet undergone chemical linkage with polymeric constituents of the formulation, at this time their contribution to the elasticity of the formulation is incomplete. Only when the crosslinking reaction is initiated, during and/or after coating, is the desired cohesion produced. The requirements imposed on the PSA formulations of the invention are therefore that the formulation in the uncrosslinked state should exhibit good processing properties, provided for example by a low first normal stress difference, and in particular the ratio R, and in the crosslinked state should exhibit good cohesion, provided for example by the holding power or the gel fraction of a self-adhesive tape test specimen. The innovative concept of the invention likewise embraces the use and coating of PSA formulations in solution, for which, however, the problems described above are fairly insubstantial. The prior art, however, also has potential for improvement in terms of the crosslinking reaction between particles and polymer. The present invention proposes innovative solutions for this.

Advantageous PSAs of the invention, obtained by way of the inventive coating and crosslinking operation, typically have a holding power according to measurement method C that is at least 50% higher, preferably at least 100% higher, than that of a formulation coated and crosslinked in exactly the same way but containing no filler particles of the invention and yet having a comparable gel fraction (measurement method A). The adhesion, given by the bond strength according to measurement method B, of the PSA system of the invention is typically at least at the same level occupied by that of the aforementioned reference system, or preferably is in fact at least 25% higher. The viscosity of the PSAs of the invention at the same temperature is no higher or only slightly higher, specifically not more than, preferably, 25% higher, than that of a formulation that contains no filler particles of the invention and is also uncrosslinked.

Composition of Inventive PSA Formulations

The PSA formulations of the invention comprise at least one kind of polymer, A, and at least one kind of filler particle, B, the at least one polymer kind A being able to join with groups X, located on the surface of the at least one filler particle kind B, through exposure to thermal energy, electromagnetic radiation, particulate radiation and/or sound energy during and/or after a coating operation. The polymer may carry groups of type Y which are capable of reaction with the functional group X. The group X bound on the surface of the at least one filler kind B originates from a group Z, which is likewise bound on the surface of the same particles, by means of thermal activation or by electromagnetic radiation, particulate radiation and/or sound energy, collectively referred to below simply as activation, the group of the type Z being per se not suitable for crosslinking reactions. The PSA of the invention may optionally comprise further constituents in addition to polymers A and filler particles B. This section will address the polymers A of the invention, the fillers B of the invention, and further constituents which may be used optionally in the PSA formulations of the invention, and will also describe the nature of the groups X, Y and Z.

The PSAs of the invention contain advantageously up to 50% by weight of at least one filler particle kind B, preferably up to 20% by weight, very preferably up to 10% by weight. The desired degree of crosslinking and consequently the hardness and adhesion of the resulting crosslinked PSA may be adjusted depending on the amount of polymer particles added.

Polymers A

The at least one polymer kind A is preferably in accordance with the invention when it has a molar mass of not more than 10 000 000 g/mol, preferably not more than 500 000 g/mol. Furthermore, the at least one polymer kind A preferably has a softening temperature of less than 100° C., more preferably less than 20° C. The at least one polymer kind A may be of linear, branched, star-shaped or grafted structure, to give but a few examples, and may be in the form of a homopolymer or copolymer. The term "copolymer" encompasses for the purposes of this invention not only copolymers in which the comonomers used for the polymerization have been incorporated in purely random fashion but also those in which there are gradients in the comonomer composition and/or local accumulations of individual comonomer kinds and also entire blocks of a monomer in the polymer chains.

The molar mass is to be understood in this context as referring to the weight average of the molar mass distribution, as is obtainable, for example, via gel permeation chromatography analyses. By softening temperature in this context is meant the glass transition temperature for amorphous systems and the melting temperature for semicrystalline systems, and may be determined, for example, by dynamic differential calorimetry (DSC). Where numerical values are given for softening temperatures, they relate in the case of amorphous systems to the middle-point temperature of the glass stage and in the case of semicrystalline systems to the temperature at maximum heat evolution during the phase transition.

Within the sense of this invention it is possible, moreover, for the at least one polymer kind A to be a block copolymer. Of particular advantage are block copolymers in which, preferably, each of the blocks present (independently of one another) has a molar mass of less than 1 000 000 g/mol, preferably less than 250 000 g/mol, is of linear, branched, star-shaped or grafted structure and/or is in the form of a homopolymer or random copolymer. With further advantage at least one kind of block has a softening temperature of less than 100° C., preferably less than 20° C. The individual kinds of block occurring in the block copolymer may differ with regard to the comonomer composition and optionally may differ in their molar mass and/or softening temperature and/or structure (e.g., linear or branched identity). The different polymer arms in star-shaped and grafted systems may be chemically different in nature: that is, may be composed of different monomers and/or may have a different comonomer composition.

Polymers of kind A are also preferred in accordance with the invention when they are able to enter into a bond, during or after a coating operation, without reactive groups or with at least one kind of groups Y present in the polymer, with groups of type X present on the surface of the at least one filler particle kind B, on exposure to thermal energy, electromagnetic radiation, particulate radiation and/or sound energy. The groups X, by means of activation by thermal energy, electromagnetic radiation, particulate radiation and/or sound energy, originate from the groups Z, which in turn, without activation and conversion into the functional groups X, are not able to enter into any crosslinking reactions, and thus make it possible for the operation to be controlled. The groups of the at least one kind Y may be present in a diversity of ways in the at least one polymer kind A. The at least one polymer kind A may be constructed, for example, as a homopolymer from monomers which contain the at least one kind of groups Y. Furthermore, the at least one polymer kind A may also be constructed as a random copolymer which is obtained at least from one kind of monomers which contain the at least one kind of groups Y and, optionally, from one or more kinds of monomers which contain no such groups. A further possibility is for the at least one polymer kind A to contain at least one kind of groups Y only at certain points along the polymer backbone. Examples of such embodiments include groups which are located at chain ends, in the region of chain points or blocking-agent points, in the region of branching points or in the region of block connection points. Polymers of the at least one kind A are particularly preferred in accordance with the invention when the polymer molecule contains on average at least two such groups. It is possible, furthermore, for the at least two groups Y to be introduced into the at least one polymer A by way of a grafting reaction. It is likewise in accordance with the invention to introduce the at least two groups Y into the at least one polymer kind A by carrying out a polymer-analogous reaction. Furthermore, any desired combinations of the stated modes of functionalization are in accordance with the invention.

As examples of polymers A, but without wishing to impose any restriction, mention may be made of the following homopolymers and random copolymers as being advantageous for the purposes of this invention: polyethers, such as polyethylene glycol, polypropylene glycol or polytetrahydrofuran, polydienes, such as polybutadiene or polyisoprene, hydrogenated polydienes, such as polyethylene-butylene or polyethylene-propylene, rubbers, such as natural rubber, nitrile rubber or chloroprene rubber, butadiene rubber, isoprene rubber, and polyisobutylene, polyolefins, such as ethylene homopolymers or copolymers, propylene homopolymers or copolymers, metallocene-catalyzed polyolefins, polysiloxanes, polyalkyl vinyl ethers, polymers of unfunctionalized α,β-unsaturated esters, copolymers based on α,β-unsaturated esters, copolymers based on alkyl vinyl ethers, and also ethylene-vinylacetate copolymers, EPDM rubbers, and styrene-butadiene rubbers. Further random copolymers which can be used with advantage are obtained by copolymerizing isoprene and/or butadiene, feature 1,4, 1,2 and/or 3,4, or 1,4 and/or 1,2, incorporation of the monomers into the polymer chain, and may be in fully or partly hydrogenated form.

Copolymers which can be used with particular advantage for the purposes of this invention are random copolymers based on unfunctionalized α,β-unsaturated ethers. When they are used for the at least one polymer kind A with copolymer character, then monomers which can be used for their preparation are, advantageously, in principle all compounds familiar to the skilled worker that are suitable for polymer synthesis. Preference is given to using α,β-unsaturated alkyl esters of the general structure $$CH_2 = C(R^1)(COOR^2) \qquad (I)$$

where $R^1$=H or $CH_3$ and $R^2$=H or represents linear, branched or cyclic, saturated or unsaturated alkyl radicals having 1 to 30, in particular having 4 to 18, carbon atoms.

Monomers which can be used with great preference in the sense of general structure I for polymers A with copolymer character include acrylic and methacrylic esters with alkyl groups consisting of 4 to 18 carbon atoms. Specific examples of such compounds, without wishing to be restricted by this enumeration, include n-butyl acrylate, n-butyl methacrylate, n-pentyl acrylate, n-pentyl methacrylate, n-hexyl acrylate, n-hexyl methacrylate, n-heptyl acrylate, n-heptyl methacrylate, n-octyl acrylate, n-octyl methacrylate, n-nonyl acrylate, n-nonyl methacrylate, n-decyl acrylate, n-decyl methacrylate, dodecyl acrylate, dodecyl methacrylate, hexadecyl acrylate, hexadecyl methacrylate, octadecyl acrylate, octadecyl methacrylate, their branched isomers, such as sec-butyl acrylate, sec-butyl methacrylate, tert-butyl acrylate, tert-butyl methacrylate, 2-ethylhexyl acrylate, 2-ethylhexyl methacrylate, and isooctyl acrylate, and also cyclic monomers such as, for example, cyclohexyl acrylate, cyclohexyl methacrylate, norbornyl acrylate, norbornyl methacrylate, isobornyl acrylate and isobornyl methacrylate.

Likewise possible for use as monomers for polymers A with copolymer character are acrylic and methacrylic esters which contain aromatic radicals, such as phenyl acrylate, benzyl acrylate, benzoin acrylate, benzophenone acrylate, phenyl methacrylate, benzyl methacrylate, benzoin methacrylate or benzophenone methacrylate.

A further possibility for use in accordance with the invention are ethoxylated and propoxylated acrylates and methacrylates. In systems of this kind the acrylate or methacrylate side chains are composed formally of an oligomer or polymer or ethylene oxide or of propylene oxide.

It is additionally possible, optionally, to use vinyl monomers from the following groups: vinyl esters, vinyl ethers, vinyl halides, vinylidene halides, and also vinyl compounds containing aromatic rings and heterocycles in α position. For the vinyl monomers which can be employed optionally, mention may be made by way of example of selected monomers which can be used in accordance with the invention: vinyl acetate, vinylformamide, vinylpyridine, ethyl vinyl ether, 2-ethylhexyl vinyl ether, butyl vinyl ether, vinyl chloride, vinylidene chloride, acrylonitrile, styrene, and α-methylstyrene.

In one preferred version of this invention the at least one polymer kind A contains its at least two groups Y in the form of at least one specific comonomer which has been randomly copolymerized during the polymerization of the polymer. The molar fraction (chemical amount fraction) of this at least one specific comonomer in relation to the composition of the total monomer mixture during the preparation of the total polymer is up to 50% by weight, preferably up to 20% by weight, very preferably up to 5% by weight. The specific character of this at least one comonomer is expressed in the fact that it carries at least one group Y which is able to enter into a bond, during or after a coating operation, with at least one group X originating from a protective group Z, located on the surface of the at least one filler particle kind B, on exposure to thermal energy, electromagnetic radiation, particulate radiation and/or sound energy. Examples of groups X, Y and Z are described in the section "Combinations of groups X and Y". Particular preference is given to using monomers based on α,β-unsaturated esters which contain these groups. It is also possible for groups Y to be joined by way of a polymer-analogous reaction with the polymer A at the sites at which these specific comonomers have been incorporated. A further possibility is for these specific comonomers to be derivatized with groups Y prior to polymerization; in other words, for comonomers with functionalization which is not necessarily in accordance with the invention to be modified, prior to polymerization and hence preparation of a polymer kind of type A, with a chemical assembly via which the at least one inventive group Y is incorporated into the comonomer and, following this modification reaction and subsequent polymerization, is available for the forming of a linkage, in accordance with the invention, with at least one group X.

As examples of comonomers which carry functional groups, mention may be made—without wishing to impose any restriction—of allyl acrylate, allyl methacrylate, tetrahydrofurfuryl acrylate, tetrahydrofurfuryl methacrylate, 2-hydroxyethyl acrylate, 2-hydroxyethyl methacrylate, 3-hydroxypropyl acrylate, 3-hydroxypropyl methacrylate, 4-hydroxybutyl acrylate, 4-hydroxybutyl methacrylate, glycidyl acrylate, glycidyl methacrylate, acrylated benzophenone, methacrylated benzophenone, crotonic acid, maleic acid, maleic anhydride, itaconic acid, itaconic anhydride, 2-dimethylaminoethyl acrylate, 2-dimethylaminoethyl methacrylate, 3-dimethylaminopropyl acrylate, 3-dimethylaminopropyl methacrylate, N-tert-butylacrylamide, N-tert-butylmethacrylamide, N-isopropylacrylamide, N-isopropylmethacrylamide, acrylamide, methacrylamide, N-methylolacrylamide, N-methylol-methacrylamide, acrylic acid, methacrylic acid, vinyl alcohol, 2-hydroxyethyl vinyl ether, 3-hydroxypropyl vinyl ether, 4-hydroxybutyl vinyl ether and allyl glycidyl ether.

If the at least one polymer kind A is a block copolymer then in the simplest case the copolymers present are diblock copolymers of the form PA-PA', composed of a block PA and a block PA', which differ in respect of the starting monomers selected and may optionally be different in their softening temperature and/or molar mass and/or structure (e.g., linear or branched). Further embodiments of polymers A with block copolymer character, without wishing to impose any restriction, are triblock copolymers of the type PA-PA'-PA", block copolymers of the type PA-PA'-PA"-PA', and higher block copolymers whose structures continue this series. Triblock copolymers and higher block copolymers are in accordance with the invention, in the sense of polymers A with block copolymer character, when all blocks linked directly to one another are different in respect of the selected starting monomers and also, optionally, in their molar mass and/or softening temperature and/or structure (e.g., linear or branched). Further, triblock copolymers and higher block copolymers are in accordance with the invention, in the sense of polymers A, if two or more of the blocks which are not linked directly to one another are not different from one another in respect of the selected starting monomers and also, optionally, in their molar mass and/or softening temperature and/or structure (e.g., linear or branched). A preferred version of a polymer A with block copolymer character is a triblock copolymer of the type PA-PA'-PA", where PA and PA" are identical in respect of the selected starting monomers, molar mass, softening temperature, and structure. The block linkage in polymers A with block copolymer character may take a linear form or alternatively a star-shaped embodiment, or a graft copolymer variant. Each individual block may be constructed as a homopolymer block or copolymer block. The blocks are therefore subject to the same definitions as given in the sections "Homopolymers" and "Random copolymers".

Where a block copolymer is employed as polymer A, then preferably at least one kind of block contains functionalizations of type Y. Particular preference is given to diblock copolymers which contain functionalizations of type Y in only one kind of block; symmetrical triblock copolymers which contain functionalizations of type Y only in two end blocks; and triblock copolymers which contain functionalities of type Y only in the middle block.

Organic Filler Particles B

As the at least one filler particle kind B for the purposes of this invention use is made preferably of filler particles in which the base units without surface modifications have softening temperatures of greater than 20° C., preferably of greater than 100° C. Furthermore, systems of the kind whose softening temperature (based on the unmodified base units) is above the decomposition temperature are in accordance with the invention when the decomposition temperature is above 200° C.

The materials on which the base unit of the at least one filler particle kind B is based may be organic in nature or may be an organic/inorganic hybrid material and may have an amorphous, partly crystalline or crystalline character.

In terms of their structure, the filler particles may be present preferably in spherical form, rodlet form or platelet form. Another embodiment according to the invention is filler particles with specific morphologies such as, for example, hollow beads, cellular, raspberry, mushroom or confetti structure [P. A. Lovell, M. S. El-Aasser, Emulsion Polymerization and Emulsion Polymers, 1997, John Wiley & Sons, Chichester]. Separate particles, often also called primary particles, are in accordance with the invention just as much as aggregates formed from a plurality of primary particles. Such systems often exhibit a fractal superstructure. Where the particles are formed from crystallites, the primary particle form depends on the nature of the crystal lattice. Platelet-form systems can also be present in the form of layer stacks.

In one advantageous embodiment of this invention the at least one functionalized filler kind is present in the pressure-sensitive adhesive substantially in the form of singular spherical particles. In that case the particle diameters have values of less than 2 µm, preferably of less than 250 nm, very preferably of less than 100 nm since in this case the specific surface is particularly large and the likelihood that a functionality is conducive to crosslinking increases. In a further advantageous version of this invention the at least one functionalized filler kind is present in the pressure-sensitive adhesive substantially in the form of singular platelet-shaped particles. The layer thickness of such platelets then has values of preferably less than 10 nm and a greatest diameter of preferably less than 1000 nm. In a further advantageous version of this invention the at least one filler kind is present in the pressure-sensitive adhesive substantially in the form of singular rodlet-shaped particles. In this case these rodlets have a diameter of less than 100 nm and a length of less than 15 µm. The rodlets may also be curved and/or flexible. Furthermore, it is possible with advantage for the purposes of this invention for the at least one filler kind to be present in the pressure-sensitive adhesive in the form of primary particle aggregates. These aggregates have a gyration radius (to be understood in analogy to the term "radius of gyration" as known from polymers) of less than 1000 nm, preferably of less than 250 nm. Particular preference is given for the purposes of this invention to using filler particles of the kind whose spatial extent in at least one direction is less than 250 nm, preferably less than 100 nm, very preferably less than 50 nm. It is possible for the purposes of this invention, furthermore, to use combinations of the aforementioned types of filler while still ensuring that the size of the filler particles does not exceed the layer thickness of the PSA at least in one dimension.

In one particularly advantageous embodiment of this invention the above-described particles or particle aggregates are present in the form of a stable dispersion, thus significantly simplifying the processing. The dispersion medium in this case by be—without wishing to impose any restriction—water, organic solvents such as ethanol, isopropanol, acetone, methyl ethyl ketone, methyl isobutyl ketone, toluene or xylene, for example, reactive systems such as the above-described monomers for preparing the PSAs, or a polymeric binder.

Typical classes of compound, advantageous in accordance with the invention, of which the base unit of the at least one filler particle kind B is composed are polymers which are prepared by means of emulsion, miniemulsion, microemulsion, inverse emulsion, dispersion, suspension or precipitation polymerization or by further polymerization techniques familiar to the skilled worker for the purpose of preparing organic particles. Likewise inventive are dendrimers of the first generation or higher, whose advantage is that they are monodisperse and that the form adapts with each generation to that of a ball. The polymers may consist of all of the monomers known to the skilled worker that can be polymerized free-radically (e.g., methyl methacrylate), anionically (e.g., styrene), cationically (e.g., vinyl ethers) or by means of metallocene or Ziegler-Natta catalysts, and/or which are capable of polyadditions (e.g., epichlorohydrin ethers of bisphenol A), polycondensation (e.g., adipic acid) or ring-opening metathesis polymerizations (ROMP, e.g., norbornene), the selection of such monomers being required to be such that the glass transition temperature of the organic polymer particles is preferably higher than that of the adhesive and more preferably higher than the drying temperature and operating temperature. It is further in accordance with the invention to use polyfunctional monomers in order to crosslink the particles and thus to ensure that the particulate form is ensured even at operating temperatures which are above the softening temperature of the polymer. The monomer composition of the polymeric particles is composed to an extent of 60% to 100% by weight of a nonfunctionalized base monomer and to an extent of 0% to 40% by weight of a functional monomer for the crosslinking, and also to an extent of 0% to 40% by weight of a monomer which may contribute to the crosslinking of the particles.

Owing to the abovementioned polymerization operations, the particles may have surface modification reagents (emulsifiers, stabilizers) whose function is primarily that of providing compatibility between the particle surface and the matrix in which they are to be dispersed. As a further function, surface modification reagents are used in order to prevent acretions of smaller particles to form larger objects. For this purpose it is possible for example to use ionic (e.g., sodium dodecyl sulfate, tetradecyltrimethylammonium bromide), zwitterionic (e.g., lecithins) or block copolymers (e.g., PEO-b-PPO-b-PEO) as surface modification reagents. In the case of the free-radical polymerization for preparing the organic filler particles, the use of at least one nonhomopolymerizable, surface-active vinyl monomer is particularly advantageous, since the use of excessive amounts of freely migratable emulsifiers in dispersion-based adhesives can lead to reduced weathering stability (moisture), and the surface-active emulsifier may accumulate at the substrate surface, which may also have an adverse effect on the bond strengths. A nonhomopolymerizable surface-active monomer is needed in order to prevent the formation of a separate polymeric emulsifier species by homopolymerization. In this way the stabilizer becomes part of the polymer and hence of the filler particle. Nonhomopolymerizable emulsifiers having propenylphenyl groups or allyl groups are preferred, examples of which include the anionic sulfates and sulfonates Mazon® SAM 181, 183, 184, 211 from PPG Industries and the nonionic emulsifiers Mazon® SAM 185-187. Furthermore, it is possible to use the macromonomers which are sold by Daiichi Kogyo Seiyaku under the names niogen RN, aquaron, and hitenol, which are polyoxyethylene-propylene phenyl ethers.

The at least one filler particle kind B is most preferably in a functionalized form. Functionalities that are typical and advantageous in accordance with the invention are benzophenone, acetophenone, benzoin, benzil and thioxanthone derivatives, hydrazines, amines, phenols, tosyl chlorides, isocyanates, carbamates, urea derivatives, aldehydes, carbonates, phosphines, carbodiimides, N-methylmorpholines, N-hydroxysuccinimide esters, imidazole groups, oxazolidine groups, oxazoline groups or sulfonic acid groups, without wishing this enumeration to impose any restriction. Use is made very advantageously for the purposes of the invention of at least one kind of functionality which offers the opportunity, via at least one group X, which is incorporated in the at least one kind of surface modification reagent, to enter into a bond with the polymer A and/or with at least one group Y, present in at least one polymer kind A, on exposure to thermal energy, electromagnetic radiation, particulate radiation and/or sound energy, during or after a coating operation. The group X is initially in blocked or deactivated form, as a group of type Z, which per se is not capable of a crosslinking reaction with the at least one polymer kind A and/or with a group Y contained in the polymer A, and is converted only by external activation, by decomposition or other chemical reactions, into the group X. The external influences for activating this conversion may likewise be thermal energy, electromagnetic radiation, particulate radiation and/or sound energy. Advantageous in this context is thermal activation, in which case in one particularly advantageous form of the group Z the activation temperature is above or equal to the operating temperature, and so crosslinking starts only after coating. U.S. Pat. No. 5,510,443 describes a number of variants for the blocking of isocyanates. By blocked isocyanates are meant functional groups which under the influence of temperature form isocyanate groups and hence initiate a reaction. Further blocked or protected groups Z known to the skilled worker may likewise be used in accordance with the invention [see: T. W. Greene, P. G. M. Wuts; *Protective Groups in Organic Synthesis,* 3rd edition, John Wiley & Sons, Inc., New York, 1999]. A filler particle carries on its surface preferably at least 10 groups of the at least one kind Z, more preferably at least 50. Examples of preferred versions of the organic filler particles are the Epocros systems from Nippon Shokubai, the APR series from Advanced Polymer, Inc., and the resins from the company Argonaut Technologies.

A further advantageous version of the organic filler particles is composed of a core-shell, raspberry or cellular structure, with only the shell or the latterly polymerized stage containing the functional monomers, thus allowing the number of functionalities on the surface to be increased and the required amount to achieve the same surface concentration of the usually expensive functional monomers to be lowered.

In one advantageous embodiment of the process of the invention the functionalized particles additionally have functional groups $X_a$, the groups $X_a$ being capable of entering, under appropriate process conditions, into a reaction with the reactive centers, more particularly with the functional groups Y of the polymer, and where, in the process, even before the conversion of the groups Z into the groups X, a crosslinking step takes place which comprises reacting the functional groups $X_a$ with the reactive centers, more particularly with the functional groups Y of the polymer.

A further inventively advantageous version of the surface-modified filler kind B comes about through a combination of the surface modification reagents, the one kind comprising at least one functional group Z which, following activation by thermal energy, electromagnetic radiation, particulate radiation and/or sound energy, decomposes or is chemically converted to form the group X, and the other kind comprising at least one kind $X_a$ which not only differs chemically from the functional group of the type X but also contributes to the crosslinking with the polymer of kind A by a different reaction mechanism. The crosslinking reaction may in this case be initiated by thermal energy, electromagnetic radiation, particulate radiation and/or sound energy, the functional groups X and $X_a$ not being activated by the same external stimuli, hence giving rise to the possibility of formulating a PSA with a dual-cure system. Hence it is possible, for example, with two kinds of groups, X and $X_a$, having different reactivities and/or activation mechanisms, to carry out partial crosslinking of oligomers or polymers, hence producing a specific viscosity range which makes processing easier, and then of initiating an aftercure reaction after the coating operation.

Further Constituents

It is additionally in accordance with the invention to use, optionally, polymers C containing at least one group of type Z, and/or polymers C containing at least one group Z and at least one group of type X, and/or polymers C containing at least one group Z and at least one group of type X and type Y, and/or polymers C containing neither type Z or X nor type Y groups, with these, on account of the low glass transition temperature, not being of particulate, rod or platelet form. The composition of those polymers, employable optionally, that contain no groups of type X, Y or Z are subject to the same details in terms of construction, composition, choice of monomers, softening temperature, and structure as contained in the definition of the polymers A, apart from the details given there in respect of groups Y. Optionally employable polymers containing at least one group Z and/or X are subject to the details given for polymers A, but such polymers C contain groups of kind Z and/or X and not groups of kind Y and can therefore, during or after a coating operation, enter, directly or by activation into a bond with the polymer kind A and/or at least one group Y of the at least one polymer of kind A by exposure to thermal energy, electromagnetic radiation, particulate radiation and/or sound energy. The incorporation of groups Z and/or X into polymers C is subject to the same details given for groups Y in the polymers A. Where polymers are employed that carry groups Z and/or X and Y, then the same details, in terms of construction, composition, choice of monomers, softening temperature, and structure, apply as contained in the definition of the polymers A, but with the addition that there is also at least one group Z and/or X present in the polymer. For the incorporation of groups Z and/or X and Y into polymers C which carry both kinds of groups, the details which apply are the same as those given for the groups Y in the polymers A.

As further constituents the PSA formulations of the invention may comprise tackifier resins, plasticizers, rheological additives, catalysts, initiators, stabilizers, compatibilizers, coupling reagents, crosslinkers, antioxidants, other aging inhibitors, light stabilizers, flame retardants, pigments, dyes, further fillers, especially those not included in at least one filler particle kind B, and/or expandants.

Combinations of Groups X and Y

The PSAs of the invention comprise at least one polymer kind A and at least one filler particle kind B. Polymers A contain at least two groups Y; filler particles B contain at least one kind of groups Z, which decomposes or is chemically transformed into group X by thermal energy, electromagnetic radiation, particulate radiation and/or sound energy. Groups X, Y and Z are chosen for the purposes of this invention such that between these groups X and Y or by way of these groups X and Y it is possible to bring about coupling between polymers A and filler particles B, whereas, in turn, no coupling is brought about between polymers A and filler particles B between groups Z and Y or by way of groups Z and Y. The coupling is initiated during or after the coating operation by exposure to thermal energy, electromagnetic radiation, particulate radiation and/or sound energy. The coupling involves at least one group X and at least one group Y. By coupling of at least one group X and at least one group Y is meant for the purposes of this invention, in particular a chemical reaction in which the at least one group X reacts with the at least one group Y and leads to the formation of a covalent bond, the formation of hydrogen bonds between the at least one group X and the at least one group Y, and/or the formation of a coordinative bond as a result, for example, of formation of a complex, involving the at least one group X and the at least one group Y, so that at least one donor/acceptor bond is formed.

The coupling in this case may take place between the groups X and Y directly or else by mediation through one or more further substances, such as coupling reagents or crosslinkers. The position and number of groups X and Y in the polymers A and filler particles B that can be used in accordance with the invention are subject to the same definitions given for the polymers A and the filler particles B.

Where the coupling of the invention between the at least one polymer kind A and the at least one filler particle kind B is to proceed via the groups Y and X as a chemical reaction, the groups X and Y involved are defined in particular in accordance with the following remarks.

The PSAs of the invention comprise at least one constituent which comprises at least one kind of inventive segments having the general structure $(R^{\circ}R^{\circ\circ}R^{\circ\circ\circ}C)$-Z. $R^{\circ}$, $R^{\circ\circ}$ and $R^{\circ\circ\circ}$ may independently of one another be saturated or unsaturated, aliphatic or aromatic hydrocarbon radicals which may also be linked to one another and may be identical or different. For the purposes of this invention it is also possible for the carbon atom in $(R^{\circ}R^{\circ\circ}R^{\circ\circ\circ}C)$-Z itself to be unsaturated. In that case said carbon atom is linked only to X and to one or two of the radicals $R^{\circ}$, $R^{\circ\circ}$ or $R^{\circ\circ\circ}$. The group Z per se is not capable of coupling with the at least one polymer kind A and must first be converted or decomposed to form the group X, by exposure to thermal energy, electromagnetic radiation, particulate radiation and/or sound energy, hence resulting in the structure $(R^{\circ}R^{\circ\circ}R^{\circ\circ\circ}C)$—X. The radicals $R^{\circ}$, $R^{\circ\circ}$, and $R^{\circ\circ\circ}$ may independently of one another include any number of heteroatoms. The radicals $R^{\circ}$, $R^{\circ\circ}$, and $R^{\circ\circ\circ}$ may be of low molecular mass or may be polymeric in nature. Up to two of the radicals $R^{\circ}$, $R^{\circ\circ}$, and $R^{\circ\circ\circ}$ may also be hydrogen atoms, moreover. At least one of the radicals $R^{\circ}$, $R^{\circ\circ}$, and $R^{\circ\circ\circ}$ is linked by a chemical bond to a filler particle of kind B. The group needed for the coupling reaction is designated X.

The at least one inventive segment of structure $(R^{\circ}R^{\circ\circ}R^{\circ\circ\circ}C)$—X can be reacted with at least one segment which is present in at least one further constituent of the PSA of the invention and which has the general structure $(R^{*}R^{}R^{*}C)$—Y. $R^{*}$, $R^{}$ and $R^{*}$ may independently of one another be saturated or unsaturated, aliphatic or aromatic hydrocarbon radicals which may also be linked to one another and may be identical or different. For the purposes of this invention it is also possible for the carbon atom in (R*RR*C)—Y itself to be unsaturated. In that case said carbon atom is linked only to Y and to one or two of the radicals R*, R or R*. The radicals R*, R, and R* may independently of one another include any number of heteroatoms. The radicals R*, R, and R* may be of low molecular mass or may be polymeric in nature. Up to two of the radicals R*, R, and R* may also be hydrogen atoms, moreover. At least one of the radicals R*, R, and R* is linked by a chemical bond, to a polymer chain of kind A. The group needed for the coupling reaction is designated Y. In specific versions of this invention, single or plural radicals R*, R or R* may be of the same identity as $R^{\circ}$, $R^{\circ\circ}$ or $R^{\circ\circ\circ}$. It is also in accordance with the invention if group X and group Y are identical. In this specific case the coupling takes place advantageously by means of a coupling reagent or by the action of a catalyst or initiator. For the purposes of this invention it is particularly advantageous if the coupling reaction is initiated by exposure to thermal energy, however it can also be initiated exclusively or by combination with electromagnetic radiation, particulate radiation and/or sound energy.

For the purposes of this invention it is possible to use an arbitrarily large number of further groups, which may react with a group X and/or with a group Y.

Figure 2:
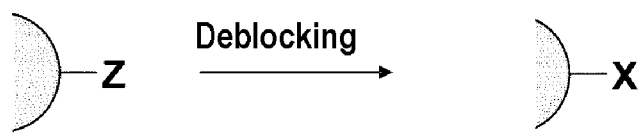
FIG. 2 illustrates the deprotection or deblocking of the group Z ro form the group X.

A coupling reaction may proceed by chemical reaction directly between the groups X and Y, so forming a species $(R^{\circ}R^{\circ\circ}R^{\circ\circ\circ}C)$—X'—Y'—(CR*RR*) (see FIG. 2). In the case of a chemical reaction, X' and Y' are the reaction products of the groups X and Y respectively. In specific cases the coupling of groups X and Y requires a coupling reagent $X^a$-$Y^a$ or $X^a$-$R^a$-$Y^a$. $X^a$ and $Y^a$ are groups capable of reaction with groups X and Y, respectively, and may be identical or different. It is also possible, furthermore, to link two groups X via coupling reagent Y-$R^b$-Y and also two groups Y via a coupling reagent X-$R^b$-X. $R^a$ and $R^b$ can be saturated or unsaturated, aliphatic or aromatic hydrocarbon radicals and may contain an arbitrary number of heteroatoms. The radicals $R^a$ and $R^b$ may be of low molecular mass or may be polymeric in nature.

Table 1 lists a number or examples of the groups Z and also of the groups X which originate from them by means of thermal energy, electromagnetic radiation, particulate radiation and/or sound energy. The table makes no claim to completeness, but is instead merely intended to set out examples of protective groups Z, for the groups X, that can be employed for the purposes of this invention. Further groups known to the skilled worker may likewise be used in accordance with the invention [see: T. W. Greene, P. G. M. Wuts: *Protective Groups in Organic Synthesis,* 3rd edition, John Wiley & Sons, Inc.; New York, 1999].

Table 2 lists a number of examples of X and Y which can be used in accordance with the invention. Combinations of groups which can be used with advantage are marked with a cross. In certain circumstances, additional reagents and/or special conditions are needed for the reaction between the groups indicated. Reagents of this kind are then added to the PSA formulation (see "Further constituents" section). Specific conditions such as temperature or radiation also come within the intention of this invention. The table does not make any claim to completeness, but is intended merely to indicate examples of groups which can be employed for the purposes of this invention, and combinations of groups that can be employed. Further groups and combinations, known to the skilled worker, for corresponding reactions may likewise be employed in accordance with the invention. The radicals $R^1$, $R^2$, $R^3$, $R^4$, $R^5$, and $R^6$ and also $R^a$, $R^b$, $R^c$, $R^d$, $R^e$ and $R^f$ in Table 1 may independently of one another be saturated or unsaturated, aliphatic or aromatic hydrocarbon radicals, which may contain any number of heteroatoms and may be of low molecular mass or may be polymeric in nature, and/or, alternatively, may be hydrogen atoms. In accordance with the definition above, the radicals may be identical or different in construction. The radicals $R^1$, $R^2$, and $R^3$ may be linked to one another, the radicals $R^5$ and $R^6$ may be linked to one another, the radicals $R^a$, $R^b$, and $R^c$ may be linked to one another, and the radicals $R^e$ and $R^f$ may be linked to one another. Cyclic acid anhydrides such as maleic anhydride or succinic anhydride may be attached arbitrarily as a chemical group to polymers A or filler particles B. Maleic anhydride offers the possibility, furthermore, of being incorporated as a comonomer in polymers A.

The entry "–PI" in Table 1 refers to a group which is possessed of a photoinitiator function. Irradiation with UV light of appropriate wavelength activates the group and, depending on the nature of the photoinitiator, a free-radical reaction or a cationic reaction is initiated. Suitable representatives of such groups are type-I photoinitiators, in other words α-cleaving initiators such as benzoin derivatives and acetophenone derivatives, benzil ketals or acylphosphine oxides, type-II photoinitiators, in other words hydrogen abstractors such as benzophenone derivatives and certain quinones, diketones and thioxanthones, and cationic photoinitiators, such as "photoacid generators" such as arylated sulfonium or iodonium salts and dimerized arylated imidazole derivatives. Further, triazine derivatives can be used to initiate free-radical and cationic reactions.

Photoinitiating groups Z and/or X and/or Y of type I include for the purposes of this invention, preferably, benzoin, benzoin ethers such as, for example, benzoin methyl ether, benzoin isopropyl ether, benzoin butyl ether, benzoin isobutyl ether, methylolbenzoin derivatives such as methylolbenzoin propyl ether, 4-benzoyl-1,3-dioxolane and its derivatives, benzil ketal derivatives such as 2,2-dimethoxy-2-phenylacetophenone or 2-benzol-2-phenyl-1,3-dioxolane, α,α-dialkoxyacetophenones such as α,α-dimethoxyacetophenone and α,α-diethoxyactophenone, α-hydroxyalkyl phenones such as 1-hydroxycyclohexyl phenyl ketone, 2-hydroxy-2-methyl-1-phenylpropanone and 2-hydroxy-2-methyl-1-(4-isopropyl-phenyl)propanone, 4-(2-hydroxyethoxy)phenyl-2-hydroxy-2-methyl-2-propanone and its derivatives, α-aminoalkylphenones such as 2-methyl-1-[4-(methylthio)phenyl]-2-morpholinopropan-2-one and 2-benzyl-2-dimethylamino-1-(4-morpholinophenyl) butan-1-one, acylphosphine oxides such as 2,4,6-trimethylbenzoyldiphenylphosphine oxide and ethyl-2,4,6-trimethylbenzoylphenylphosphinate, and O-acyl-α-oximino ketones.

Photoinitiating groups of type II that can be used with preference in accordance with the invention are based for example on benzophenone and its derivatives such as 2,4,6-trimethylbenzophenone or 4,4'-bis(dimethylamino)benzophenone, thioxanthone and its derivatives such as 2-isopropylthioxanthone and 2,4-diethylthioxanthone, xanthone and its derivatives, and anthraquinone and its derivatives.

Type-II photoinitiators are used with particular advantage in combination with nitrogen-containing coinitiators, known as amine synergists. For the purposes of this invention it is preferred to use tertiary amines. Furthermore, in combination with type-II photoinitiators, hydrogen atom donors are employed advantageously. Examples thereof are substrates which contain amino groups. Examples of amine synergists are methyldiethanolamine, triethanolamine, ethyl 4-(dimethylamino)benzoate, 2-n-butoxyethyl 4-(dimethylamino)benzoate, isoacryl 4-(dimethylamino)benzoate, 2-(dimethylaminophenyl)ethanone, and also unsaturated tertiary amines copolymerizable therewith, (meth)acrylated amines, unsaturated, amine-modified oligomers and polymers based on polyester or polyether, and amine-modified (meth)acrylates. For the purposes of this invention it is possible for such chemical assemblies to be linked to polymers and/or fillers.

For the purposes of this invention it is also possible to use any desired combinations of different varieties of type-I and/or type-II photoinitiating groups.

In one particularly preferred version of this invention, groups of photoinitiating character are present as groups Y in at least one kind of polymers A.

In a further particularly preferred version of this invention, groups of photoinitiating character are present as groups Z and/or X in at least one kind of functionalized filler particles B.

When the coupling of the invention between the at least one polymer kind A and the at least one filler particle kind B proceeds via the groups Y and X by way of the formation of hydrogen bonds, the groups X and Y involved are defined in accordance with the following remarks. In this regard see, for example, D. Philp, J. F. Stoddard, *Angew. Chem.*, 1996, 108, 1242-1286 or C. Schmuck, W. Wienand, *Angew. Chem.*, 2001, 113, 4493-4499.

The PSAs of the invention comprise in this case at least one constituent which comprises one kind of segments having the general structure $(R^{\#}R^{\#\#}R^{\#\#\#}C)-X^{\#}$. $R^{\#}$, $R^{\#\#}$ and $R^{\#\#\#}$ may independently of one another be saturated or unsaturated, aliphatic or aromatic hydrocarbon radicals which may also be linked to one another and may be identical or different. For the purposes of this invention it is also possible for the carbon atom in $(R^{\#}R^{\#\#}R^{\#\#\#}C)-X^{\#}$ itself to be unsaturated. In that case said carbon atom is linked only to $X^{\#}$ and to one or two of the radicals $R^{\#}$, $R^{\#\#}$ or $R^{\#\#\#}$. The radicals $R^{\#}$, $R^{\#\#}$, and $R^{\#\#\#}$ may independently of one another include any number of heteroatoms. The radicals $R^{\#}$, $R^{\#\#}$, and $R^{\#\#\#}$ may be of low molecular mass or may be polymeric in nature. Up to two of the radicals $R^{\#}$, $R^{\#\#}$, and $R^{\#\#\#}$ may also be hydrogen atoms, moreover. At least one of the radicals $R^{\#}$, $R^{\#\#}$, and $R^{\#\#\#}$ is linked by a chemical bond, to a filler particle of kind B. The group needed for the coupling reaction is designated $X^{\#}$, which again originates from a group Z by means of thermal energy, electromagnetic radiation, particulate radiation and/or sound energy. The group Z in turn either is not capable of the coupling of the at least one polymer kind A to the at least one filler particle B through formation of hydrogen bonds, or may likewise feature such interactions, which, however, owing to polyvalence effects or chelation, for example, are not as strongly pronounced as in the case of the group $X^{\#}$.

The at least one inventive segment of structure $(R^{\#}R^{\#\#}R^{\#\#\#}C)-X^{\#}$ is able to form hydrogen bonds with at least one functional segment which is present in at least one further constituent and which has the general structure $(R^{\sim}R^{\sim\sim}R^{\sim\sim\sim}C)-Y^{\sim}$. $R^{\sim}$, $R^{\sim\sim}$ and $R^{\sim\sim\sim}$ may independently of one another be saturated or unsaturated, aliphatic or aromatic hydrocarbon radicals which may also be linked to one another and may be identical or different. For the purposes of this invention it is also possible for the carbon atom in $(R^{\sim}R^{\sim\sim}R^{\sim\sim\sim}C)-Y^{\sim}$ itself to be unsaturated. In that case said carbon atom is linked only to $Y^{\sim}$ and to one or two of the radicals $R^{\sim}$, $R^{\sim\sim}$ or $R^{\sim\sim\sim}$. The radicals $R^{\sim}$, $R^{\sim\sim}$, and $R^{\sim\sim\sim}$ may independently of one another include any number of heteroatoms. The radicals $R^{\sim}$, $R^{\sim\sim}$, and $R^{\sim\sim\sim}$ may be of low molecular mass or may be polymeric in nature. Up to two of the radicals $R^{\sim}$, $R^{\sim\sim}$, and $R^{\sim\sim\sim}$ may also be hydrogen atoms, moreover. At least one of the radicals $R^{\sim}$, $R^{\sim\sim}$, and $R^{\sim\sim\sim}$ is linked by a chemical bond, to a polymer chain of kind A. The group needed for the coupling reaction is designated $Y^{\sim}$. In specific versions of this invention, single or plural radicals $R^{\sim}$, $R^{\sim\sim}$, and $R^{\sim\sim\sim}$ may be of the same identity as $R^{\#}$, $R^{\#\#}$ or $R^{\#\#\#}$. It is also in accordance with the invention if group $X^{\#}$ and group $Y^{\sim}$ are identical. In this specific case the coupling takes place by means of a coupling reagent.

For the purposes of this invention it is possible to use an arbitrarily large number of further groups, which may enter into a bond with at least one group X and/or at least one group Y.

A coupling reaction may proceed by formation of hydrogen bonds directly between the groups $X^{\#}$ and $Y^{\#}$ so forming a species $(R^{\#}R^{\#\#}R^{\#\#\#}C)-X^{\#}-Y^{\sim}-(CR^{\sim}R^{\sim\sim}R^{\sim\sim\sim})$ (see FIG. 2). In specific cases the coupling of groups $X^{\#}$ and $Y^{\sim}$ requires a coupling reagent $X^{\#a}-Y^{\sim a}$ or $X^{\#a}-R^{a'}-Y^{\sim a}$. $X^{\#a}$ and $Y^{\sim a}$ are groups capable of forming hydrogen bridges with groups $X^{\#}$ and $Y^{\sim}$, respectively, and may be identical or different. It is also possible, furthermore, to link two groups $X^{\#}$ via coupling reagent $Y^{\sim}-R^{b'}-Y^{\sim}$ and also two groups $Y^{\sim}$ via a coupling reagent $X^{\sim}-R^{b'}-X^{\sim}$. $R^{a'}$ and $R^{b'}$ can be saturated or unsaturated, aliphatic or aromatic hydrocarbon radicals and may contain an arbitrary number of heteroatoms. The radicals $R^{a'}$ and $R^{b'}$ may be of low molecular mass or may be polymeric in nature.

The coupleable groups may be unidentate or, preferably multidentate. Denticity refers in this case to the capacity of a group to form a certain number of hydrogen bonds. Hydrogen bonds between unidentate or, preferably, multidentate functional segments, as structure-forming elements, are known from a variety of examples. In nature, hydrogen bonds between complementary functional segments are used for the construction of deoxyribonucleic acid (DNA) and ribonucleic acid (RNA). A specific combination of donor and acceptor sites makes it possible for couplings to be able to take place only in accordance with the lock-and-key principle. Where, for example, the functional segments α ("key" type) and β ("lock" type) are complementary segments which are able to form hydrogen bonds, then a compound is possible between α and β but not between α and α or between β and β. With regard to the selection of the functional segments, nature, when constructing DNA, restricts itself to the two organic base pairs adenine/thymine (or uracil instead of thymine in RNA) as bidentate segments and cytosine/guanine as tridentate segments.

Figure 4:
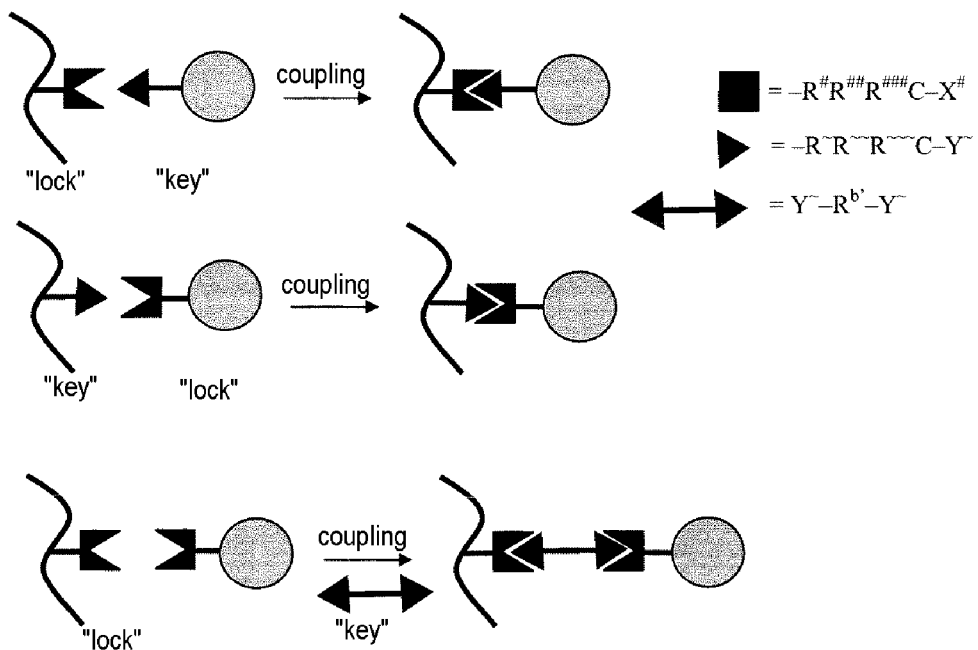
FIG. 4 illustrates two examples of the coupling of reactive constituents via formation of hydrogen bonds.

For the purposes of this invention it is possible to use polymers A and filler particles B having groups based on adenine, thymine, uracil, cytosine, guanine, derivatives thereof, and also further compounds capable of forming hydrogen bonds by the lock-and-key principle, such as, for example, 2-ureido-4-pyrimidone and its derivatives, 2,6-diacetylaminopyridine and its derivatives, diacetylpyrimidine and its derivatives, and ureidoacylpyrimidine and its derivatives. This listing makes no claim to completeness. Instead, the skilled worker is aware of further systems which can be used in accordance with the invention. When this kind of functionalization is chosen, then, for the purposes of this invention, either the at least one polymer kind A carries groups of the "key" type and the at least one filler particle B carries groups of the "lock" type, or vice versa. FIG. 4 shows two examples of the coupling of reactive constituents via formation of hydrogen bonds, by using two complementary groups; on the one hand, the direct coupling of polymer A and filler particle B, and, on the other, the coupling of polymer A and filler particle B using a coupling reagent ("key-lock principle").

Likewise possible in accordance with the invention is the coupling of groups via coordinate bonds. Examples of coordinate bonds are ligand-central atom bonds in complexes, i.e., the formation of a coordinate bond with metal atoms which may be present in elemental form, in the form of metal salts and/or in the form of metal complexes, and also all other donor-acceptor bonds (in this regard see, for example, D. Philp, J. F. Stoddard, *Angew. Chem.*, 1996, 108, 1242-1286; M. Rehahn, *Acta Polym.*, 1998, 49, 201-224 or B. G. G. Lohmeijer, U.S. Schubert, *J. Polym. Sci. A Polym. Chem.*, 2003, 41, 1413-1427).

If this coupling principle is chosen for the purposes of this invention, then the PSA comprises filler particles of kind B which contain groups having the general structure $(R^§R^{§§}R^{§§§}C)—X^§$. $R^§$, $R^{§§}$ and $R^{§§§}$ may independently of one another be saturated or unsaturated, aliphatic or aromatic hydrocarbon radicals which may also be linked to one another and may be identical or different. For the purposes of this invention it is also possible for the carbon atom in $(R^§R^{§§}R^{§§§}C)—X^§$ itself to be unsaturated. In that case said carbon atom is linked only to $X^§$ and to one or two of the radicals $R^§$, $R^{§§}$ or $R^{§§§}$. The radicals $R^§$, $R^{§§}$, and $R^{§§§}$ may independently of one another include any number of heteroatoms. The radicals $R^§$, $R^{§§}$, and $R^{§§§}$ may be of low molecular mass or may be polymeric in nature. Up to two of the radicals $R^§$, $R^{§§}$, and $R^{§§§}$ may also be hydrogen atoms, moreover. At least one of the radicals $R^§$, $R^{§§}$, and $R^{§§§}$ is linked by a chemical bond, to a filler particle of kind B. The group needed for the coupling reaction is designated $X^§$, which again originates from a group Z by means of thermal energy, electromagnetic radiation, particulate radiation and/or sound energy. The group Z in turn either is not capable of the coupling of the at least one polymer kind A to the at least one filler particle B through formation of a coordinate bond, or may likewise contain such bonds, which, however, owing to polyvalence effects or chelation, for example, are not as strong as those of the group $X^§$, and so, up until the time of the conversion of the group Z into the group $X^§$, the polymer remains readily processable and in one preferred embodiment can be processed from the melt. At the same time the PSA comprises polymers of kind A which contain groups having the general structure $(R^=R^{==}R^{===}C)—Y^=$. $R^=$, $R^{==}$ and $R^{===}$ may independently of one another be saturated or unsaturated, aliphatic or aromatic hydrocarbon radicals which may also be linked to one another and may be identical or different. For the purposes of this invention it is also possible for the carbon atom in $(R^=R^{==}R^{===}C)—Y^=$ itself to be unsaturated. In that case said carbon atom is linked only to $Y^=$ and to one or two of the radicals $R^=$, $R^{==}$ or $R^{===}$. The radicals $R^=$, $R^{==}$, and $R^{===}$ may independently of one another include any number of heteroatoms. The radicals $R^=$, $R^{==}$, and $R^{===}$ may be of low molecular mass or may be polymeric in nature. Up to two of the radicals $R^=$, $R^{==}$, and $R^{===}$ may also be hydrogen atoms, moreover. At least one of the radicals $R^=$, $R^{==}$, and $R^{===}$ is linked by a chemical bond, to a polymer chain of kind A. The group needed for the coupling reaction is designated $Y^=$. The groups $X^§$ and $Y^=$ may be identical or different. If they are different, then one of the varieties of groups takes on the donor function and the other the acceptor function that are necessary for the formation of coordinate bonds. If both groups are of the same kind, then the coordinate bond is formed by way of a coupling reagent.

Figure 5:
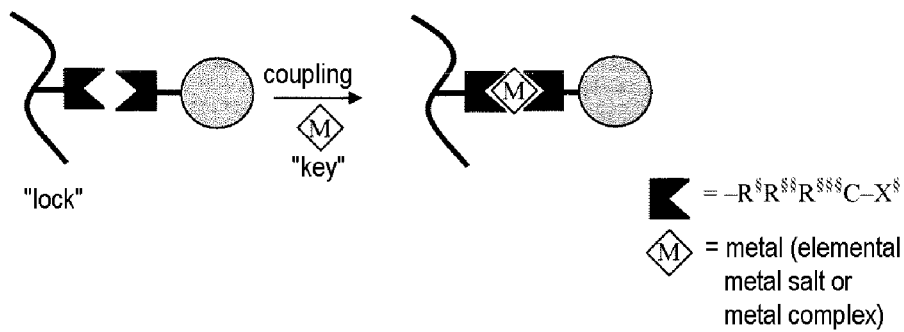
FIG. 5 is a diagrammatic illustration of the coupling principle using a metal compound as the key.

The groups in the polymers A and filler particles B are advantageously constructed such that they are capable of being able to form coordinate bonds with metals of type M, which may be in elemental form, in metal salt form or in the form of metal complexes. Metal complexes may also be polynuclear. Unidentate or multidentate segments may be employed. The coupling principle is depicted diagrammatically in FIG. 5. At least two groups of the "key" type couple by coordination of M, which takes on the "lock" function. During the formation of the coordinate bond ("coupling"), the structure of M may alter to become M'. This may be manifested in altered oxidation states or else in an altered ligand structure and/or ligand composition. When using metal atoms it is particularly advantageous for the purposes of this invention to take special precautions to disperse M in the PSA. This is preferably accomplished by choosing particularly suitable counterions, in the case of metal salts, or particularly suitable complex ligands, in the case of metal complexes. Suitable counterions and complex ligands therefore take on the function of compatibilizers and dispersing assistants. It is particularly advantageous to disperse the metal atom M in a meltable matrix that contains no constituents able to enter into coordinate bonds with M. This mixture is metered into the rest of the PSA formulation, comprising at least one polymer kind A and at least one filler particle kind B, not until immediately before the coating operation.

Particular preference is given to coupling using chelating segments. Examples of ligands which may be employed as groups are bipyridine and terpyridine and also their derivatives, acetylacetonate and its derivatives, ethylenediaminetetraacetic acid and its derivatives, nitrilotriacetic acid and its derivatives, hydroxyethylethylenediaminetriacetic acid and its derivatives, diethylenetriaminepentaacetic acid and its derivatives, and carboxylic acids. This listing makes no claim to completeness. Instead, the skilled worker will be aware of further systems which may be used in accordance with the invention. These groups are not reactive with one another. All constituents containing these groups can therefore be used in one mass stream. The coupling of the groups takes place as soon as the mixture comprising metal atom M is admixed to the mass stream, which for the purposes of this invention takes place immediately prior to the coating operation.

Suitable metal atoms for the purposes of this invention are all those chemical elements capable of acting as an acceptor for coordinate bonds. These are alkaline earth metals, preferably Ca and/or Mg, transition metals, preferably Ti, Mn, Fe, Co, Ni, Cu, Zn, Mo, Ru, Rh, Pd, W, Re, Os, Ir and/or Pt, and also Al and lanthanoids. Examples of suitable compatibilizers and dispersing assistants for these metal atoms which can be used in accordance with the invention are alkoxides of aliphatic or aromatic, saturated or unsaturated molecules containing any desired number of heteroatoms, it being possible for these molecules to be of low molecular mass or to be polymeric in nature. Additionally suitable are open-chain or cyclic unsaturated hydrocarbons which contain any number of heteroatoms and may be of low molecular mass or may be polymeric in nature. Further dispersing assistants and compatibilizers for M, useful in accordance with the invention, are low molecular mass chelating compounds of organic identity.

Figure 6:
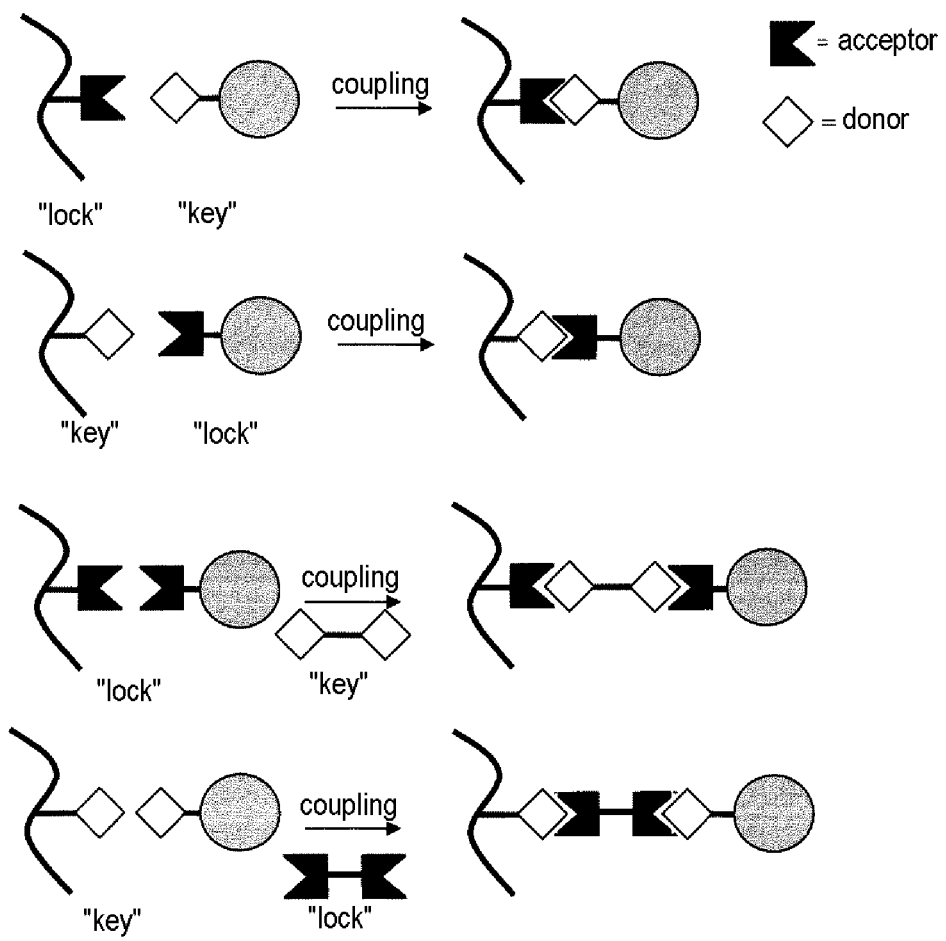
FIG. 6 illustrates the formation of coordinate bonds between an acceptor group (key) and donor group of the lock type.

Generally speaking, M can be an acceptor group ("key") which in conjunction with a donor group of the "lock" type is able to form a coordinate bond. In this case the acceptor group may be attached to polymer A and filler particle B or else may be used in the form of coupling reagents. This general case is depicted diagrammatically in FIG. 6. It is further in accordance with the invention to use filler particles B and polymers A furnished with acceptor groups in combination with coupling reagents which carry donor groups.

For the purposes of this invention it is possible for any desired combinations of different sorts of coupling reactions to be employed. In accordance with the invention at least one kind of coupling reaction is used.

Methods of Producing Self-Adhesive Products

The production of self-adhesive products of the invention embraces the operating steps of formulating/compounding, of coating, and of crosslinking.

Compounding Methods

The formulations of the invention can be produced, in the case of dispersion-based adhesives, in stirred vessels. Other adhesives can also be produced using solvents in stirred vessels or, for example, in solvent kneading apparatus or else by using high-speed dispersers. Preferably, however, formulations of this kind are produced solventlessly. Appropriate for this purpose are kneading apparatus, in batch operation, and extruders, such as twin-screw extruders, in continuous operation. Suitable compounding units for the purposes of this invention are those which contain dispersive and, optionally, distributive mixing elements. Dispersive mixing elements ensure very fine distribution of the filler particles in the formulation, while the distributive elements homogenize melted constituents such as resins or polymers in the mixture of the PSA formulation. Particularly appropriate in solventless batch operation are Banbury mixers and also kneading apparatus of Buss or Baker-Perkins type. In continuous operation, twin-screw extruders in corotating mode can be used with preference.

Coating Methods

Coating methods which can be employed for the purposes of this invention include knife coating methods, nozzle knife coating methods, rolling rod nozzle methods, extrusion nozzle methods, casting nozzle methods, and caster methods. Likewise in accordance with the invention are application methods such as roll application methods, printing methods, screen-printing methods, patterned roll methods, ink-jet methods, and spraying methods. For the feeding of the coating unit of the invention it is possible as an option to include a conveying and/or mixing assembly, e.g., a single-screw or twin-screw extruder, between metering system and mixing system. The extruder which can be used alternatively is separately heatable. A further drying step is combined with the coating at least in the case of solvent-containing adhesive systems.

Crosslinking Methods

It is particularly preferred to initiate the crosslinking of the PSA following the operation of applying it by coating. Advantageous for this purpose is a radiation process. One very preferred variant that may be mentioned, and that be used for the purposes of this invention, is that of crosslinking with ultraviolet radiation. By means of brief exposure to light in a wavelength range between 200 to 400 nm, the coated material, which in this version of the invention contains the photoinitiator functions preferably as groups X and/or groups Y, is irradiated and hence crosslinked. Employed in particular for this purpose are high-pressure or medium-pressure mercury lamps at a power of 80 to 240 W/cm. Other radiation sources which can be used for the purposes of this invention are those familiar to the skilled worker. Alternatively, the emission spectrum of the lamp is adapted to the photoinitiator used, or the type of photoinitiator is adapted to the lamp's spectrum. The intensity of irradiation is adapted to the respective quantum yield of the UV photoinitiator, to the degree of crosslinking that is to be set, and to the web speed.

Furthermore, it is possible with preference to crosslink the PSA formulations of the invention with electron beams after they have been applied by coating. This may also take place in combination with a UV crosslinking operation. Typical irradiation equipment that may be employed includes linear cathode systems, scanner systems, and segmented cathode systems where electron beam accelerators are concerned. Typical acceleration voltages are situated in the range between 50 kV and 1 MV, preferably between 80 kV and 300 kV. The radiation doses employed are situated between 5 to 250 kGy, in particular between 20 and 100 kGy.

A further advantageous embodiment is the initiation of the crosslinking reaction by means of sound energy, such as ultrasound, for example, in which case the group Z undergoes decomposition to form the group X, which only then is capable of reaction with the at least one polymer of kind A or with the group Y which is attached to the at least one polymer of kind A. In one particularly advantageous embodiment of this variant the initiation takes place, in the case both of a batch regime and of a continuous regime, either between the compounding operation and the coating operation, or after the coating operation, in order to ensure that the adhesive can be processed specifically in respect of a solvent-free operating regime. The sound energy is generated by means of direct sonication horns. Further sound sources which can be employed for the purposes of this invention are the sound sources that are familiar to the skilled worker. The actual crosslinking takes place thermally, following the sound energy activation. The thermal energy for the crosslinking reaction is then taken either from the preheated streams of adhesive, is made available by setting a temperature of the coating unit, or is realized by way of a heating tunnel and/or an infrared section after the coating operation. It is likewise possible in accordance with the invention to utilize the thermal energy given off in one or more exothermic reactions in order for this thermal reaction to proceed. Combinations of these methodological possibilities, particularly with the radiation crosslinking methods, are possible within the context of this invention.

Use is made commonly of direct sonication horns whose powers are in the range between 50 W and 16 kW, preferably 1 kW and 16 kW. The frequencies employed lie between 20 kHz to 2 MHz, more particularly between 20 and 30 kHz.

For the purposes of this invention it is additionally possible with preference to realize the crosslinking by exposure to thermal energy. This can be done optionally in combination with one or more radiation methods. Where thermal energy is used to initiate the crosslinking reaction, care must be taken to ensure that, during the coating operation, the crosslinking process has not progressed too far, since this alters the coating characteristics of the formulation. Particular preference is given in this case to producing a compound which already comprises filler particles of kind B and polymers of kind A, but with the group X, which originates from group Z by a chemical reaction, dissociation or decomposition by means of electrochemical radiation, particulate radiation, sound energy or, most advantageously, thermal energy, and Y selected such that they are able to react not directly with one another but rather only through the intermediacy of a crosslinker or a coupling reagent. In that case, crosslinkers or coupling reagents are preferably metered into the otherwise fully homogenized compound immediately prior to the coating operation, and are mixed with said compound. Optionally, a two-component or multicomponent operation is conducted in which the particularly advantageous aspect of this invention is that, because of the protection and/or blocking of group X, in this process, all of the raw materials must be divided up between at least two mass reservoirs in such a way as to ensure the physical separation, up until immediately prior to the coating operation, of all those raw materials that are capable of a reaction with one another. In the case of a thermal reaction or deprotection of the group Z to form the group X it is of advantage to set a temperature profile during compounding, so that the temperature needed for conversion or deprotection, which with particular preference is much higher than the standard operating temperatures, is achieved only shortly before the adhesive is removed, from the compounder for example in the case of a batch process or only shortly before exit from the compounding unit in the case of a continuous process, in order to prevent excessive crosslinking in the course of mixing. The thermal energy for the crosslinking reaction is then taken either from the preheated adhesive streams, is made available by the setting of the temperature of the coating unit, or is realized by way of a heating tunnel and/or an infrared section after the coating operation. It is likewise possible in accordance with the invention to utilize the thermal energy given off in one or more exothermic reactions in order for this thermal reaction to proceed. Combinations of these methodological possibilities, particularly with the radiation crosslinking methods, are possible within the context of this invention. Where the conversion or deprotection of the group Z to form the group X takes place by electromagnetic radiation, particulate radiation and/or sound energy, it is particularly advantageous, in the case both of a batch regime and of a continuous regime, to allow the irradiation or sonication of the adhesive between the compounding operation and the coating operation, it being possible for this to take place with the methods already described above and also with the apparatus for generating the radiation or ultrasound. In both advantageous versions of the invention, the thermal energy for the crosslinking reaction is then either taken from the preheated adhesive streams, made available by setting a temperature of the coating unit, or realized by way of a heating tunnel and/or an infrared section after the coating operation. It is likewise possible in accordance with the invention to utilize the thermal energy given off in one or more exothermic reactions in order for this thermal reaction to proceed.

With great preference in the context of this invention, self-adhesive products of the invention are produced in a continuous operation in the course of which the steps of compounding, of coating, of crosslinking and, where appropriate, of drying are coupled directly and hence in which an inline operation is employed, it also being possible for individual process steps to run at least partially simultaneously, such as, for example, crosslinking and drying.

Self-Adhesive Products
Product Constructions

Figure 7:
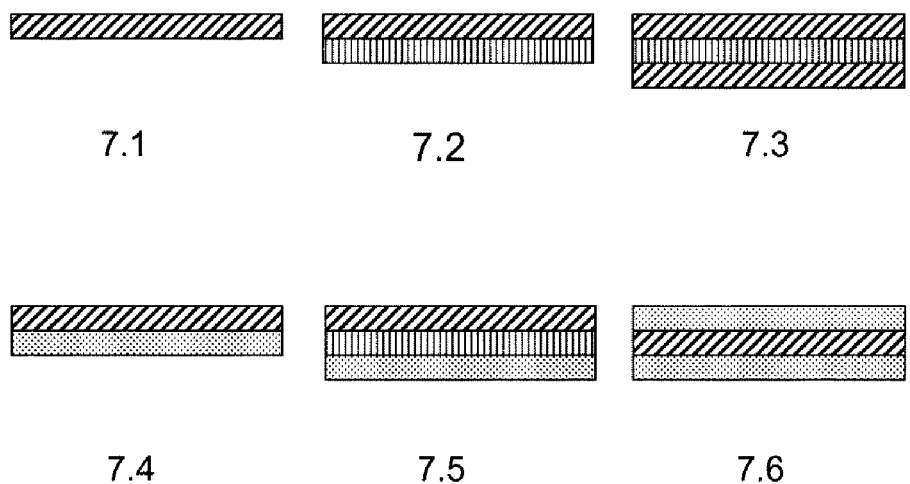
FIG. 7 depicts inventive constructions of self-adhesive products.

The pressure-sensitive adhesives prepared by the processes of the invention can be utilized for constructing different kinds of self-adhesive products such as, for example, self-adhesive tapes or self-adhesive sheets. Inventive constructions of self-adhesive products are depicted in FIG. 7. Each layer in the self-adhesive tape constructions of the invention may, as an alternative, be in foamed form.

In the simplest case a self-adhesive product of the invention is composed of the pressure-sensitive adhesive (PSA) in single-layer construction (construction in FIG. 7.1). This construction may optionally be lined on one or both sides with a release liner, e.g., a release film or release paper. The layer thickness of the PSA is typically between 1 µm and 2000 µm, preferably between 5 µm and 1000 µm.

The PSA may additionally be on a backing, in particular a film or paper backing or a sheetlike textile structure (construction in FIG. 7.2). The backing in this case may have been pretreated in accordance with the prior art on the side facing the PSA, so that, for example, an improvement in PSA anchorage is obtained. The side may also have been provided with a functional layer which can act, for example, as a barrier layer. The reverse of the backing may have been pretreated in accordance with the prior art so as to achieve, for example, a release effect. The reverse of the backing may also have been printed. The PSA may optionally be lined with a release paper or release film. The PSA has a typical layer thickness of between 1 µm and 2000 µm, preferably between 5 µm and 1000 µm.

In the case of the construction according to FIG. 7.3 the self-adhesive product is a double-sided product comprising as its middle layer, for example, a backing film, a backing paper, a sheetlike textile structure, a backing foam or a viscoelastic polymeric backing material. In this construction, PSAs of the invention of identical or different kind and/or of identical or different layer thickness are employed as top and bottom layers. The backing (or carrier) may in this case have been pretreated in accordance with the prior art on one or both sides, thereby achieving, for example, an improvement in PSA anchorage. It is also possible for one or both sides to have been provided with a functional layer which connect, for example, as a barrier layer. The PSA layers may optionally be lined with release papers or release films. The layers of PSA typically have thicknesses, independently of one another, of between 1 µm and 2000 µm, preferably between 5 µm and 1000 µm.

As a further double-sided self-adhesive product, the construction according to FIG. 7.4 is an inventive variant. A PSA layer of the invention carries on one side a further PSA layer which, however, may be of any desired nature and therefore need not be inventive. The construction of this self-adhesive product may be lined optionally with one or two release films or release papers. The layers of PSA typically have thicknesses, independently of one another, of typically between 1 µm and 2000 µm, preferably between 5 µm and 1000 µm.

As in the case of the construction in FIG. 7.4, the construction according to FIG. 7.5 is a double-sided self-adhesive product which comprises a PSA of the invention and also one other PSA of any kind. In FIG. 7.5, however, two PSA layers are separated from one another by a backing (or carrier), a backing film, backing paper, a sheetlike textile structure, a backing foam or a viscoelastic polymeric backing material. The backing in this case may have been pretreated in accordance with the prior art on one or both sides, thereby achieving, for example, an improvement in PSA anchorage. It is also possible for one or both sides to have been provided with a functional layer which connect, for example, as a barrier layer. The PSA layers may optionally be lined with release paper or release film. The PSA layers have thicknesses, independently of one another, of typically between 1 µm and 2000 µm, preferably between 5 µm and 1000 µm.

The self-adhesive product of the invention according to FIG. 7.6 comprises a layer of inventive material as a middle layer, which is provided on both sides with any desired PSAs of identical or different type. One or both sides of the middle layer may have been provided with a functional layer which connect, for example, as a barrier layer. For the outer PSA layers it is not necessary for inventive PSAs to be employed. The outer PSA layers may optionally be lined with release paper or release film. The outer PSA layers have thicknesses, independently of one another, of typically between 1 µm and 2000 µm, preferably between 5 µm and 1000 µm. The thickness of the middle layer is typically between 1 µm and 2000 µm, preferably between 5 µm and 1000 µm.

Test Methods

In the description of this invention, numerical values are given for systems of the invention and reference is made to test methods by means of which such data can be determined. These test methods are collated below.

Determining the Gel Fraction (Measurement Method A)

Coated and crosslinked, solvent-free PSA samples are welded into a nonwoven polyethylene pouch. Soluble constituents are extracted with toluene for a period of three days, the solvent being replaced daily. The difference in sample weights before and after extraction gives the gel index, as the percentage weight fraction of the polymer which cannot be extracted with toluene.

180° Bond Strength Test (Measurement Method B1)

A strip, 20 mm wide, of an acrylate PSA applied as a layer to polyester was applied to steel plates which had been washed beforehand twice with acetone and once with isopropanol. The PSA strip was pressed onto the substrate twice with an applied pressure corresponding to a weight of 2 kg. Immediately thereafter the adhesive tape was peeled from the substrate at a speed of 300 mm/min and at an angle of 180°. All measurements were conducted at room temperature.

The results are reported in N/cm and are averaged from three measurements.

90° Bond Strength, Steel-Open and Lined Side (Measurement Method B2 in Particular for Three-Layer Constructions)

The bond strength to steel is determined under test conditions of 23° C.+/−1° C. temperature and 50%+/−5% relative humidity. The specimens were cut to a width of 20 mm and adhered to a steel plate. Prior to the measurement the steel plate is cleaned and conditioned. For this purpose the plate is first wiped down with acetone and then left to stand in the air for 5 minutes to allow the solvent to evaporate. The side of the triple-layer assembly facing away from the test substrate was then lined with a 50 μm aluminum foil, thereby preventing the sample from expanding in the course of the measurement. This was followed by the rolling of the test specimen onto the steel substrate. For this purpose the tape was rolled over 5 times back and forth, with a rolling speed of 10 m/min, using a 2 kg roller. Immediately after the rolling-on operation, the steel plate was inserted into a special mount which allows the specimen to be peeled at an angle of 90° vertically upward. The measurement of bond strength was made using a Zwick Tensile Testing Machine. When the lined side is applied to the steel plate, the open side of the triple-layer assembly is first laminated to the 50 μm aluminum foil, the release material is removed, and the system is adhered to the steel plate, and subjected to analogous rolling-on and measurement.

The results measured on both sides, open and lined, are reported in N/cm and are averaged from three measurements.

Determining the Holding Power (Measurement Method C)

The test takes place in accordance with PSTC-7. A PSA layer 50 μm thick is applied to a PET film 25 μm thick. A strip of this specimen 1.3 cm wide is adhered to a polished steel plaque over a length of 2 cm using a 2 kg roller, the specimen being rolled over back and forth twice. The plaques are equilibrated under test conditions (temperature and atmospheric humidity) for 30 minutes, but without a load. Then the test weight is hung on, thereby producing a shearing stress parallel to the surface of the bond, and a measurement is made of the time taken for the bond to fail.

Microshear Test (Measurement Method D)

This test serves for the accelerated testing of the shear strength of adhesive tapes under temperature load.

Sample Preparation for Microshear Test:

An adhesive tape (length approximately 50 mm, width 10 mm) cut from the respective sample specimen is adhered to a steel test plate, which has been cleaned with acetone, in such a way that the steel plate protrudes beyond the adhesive tape to the right and left and that the adhesive tape protrudes beyond the test plate by 2 mm at the top edge. The bond area of the sample in terms of height×width is 13 mm×10 mm. The bond side is subsequently rolled over six times using a 2 kg steel roller at a speed of 10 m/min. The adhesive tape is reinforced flush with a stable adhesive strip which serves as a support for the travel sensor. The sample is suspended vertically by means of the test plate.

Microshear Test

The sample specimen for measurement is loaded at the bottom end with a weight of 100 g. The test temperature is 40° C., the test duration 30 minutes (15 minutes' loading and 15 minutes' unloading). The shear travel after the predetermined test duration at constant temperature is reported as the result in μm, as both the maximum value ["max"; maximum shear travel as a result of 15-minute loading] and the minimum value ["min"; shear travel ("residual deflection") 15 minutes after unloading; on unloading there is a backward movement as a result of relaxation]. Likewise reported is the elastic component in percent ["elast"; elastic component=(max−min)*100/max].

SAFT—Shear Adhesive Failure Temperature (Measurement method E)

The SAFT test is an accelerated test of the short-term temperature resistance of the adhesives or adhesive tapes. The specimens were reinforced with a 50 μm aluminum foil and the remaining adhesive side was adhered to a ground steel test plate which had been cleaned with acetone, and was then rolled over six times using a 2 kg steel roller at a speed of 10 m/min. The bond area of the sample in terms of height×width was 13 mm×10 mm. The top part of the specimen, which protrudes by 2 mm beyond the test plate, was reinforced with a stable adhesive strip. At that point, after the sample had been vertically suspended, the travel sensor was mounted. The sample for measurement was loaded at the bottom end with a weight of 50 g. The steel test plate with the bonded sample was then heated, beginning at 25° C. and at a rate of 9° C. per minute, to the final temperature of 200° C. A measurement was made of the slip travel of the sample as a function of temperature and time, using the travel sensor. Measurement was ended when the predetermined final temperature was reached or when a slip travel of >1000 μm was attained.

The SAFT test is able to supply two test features: SAFT shear travel or SAFT short-term temperature resistance. The SAFT shear travel is the slip travel in μm when the final temperature is reached. The SAFT short-term temperature resistance is the temperature at which a slip travel of 1000 μm is attained. The figure reported is in each case the average from a duplicate determination.

K Value (According to Fikentscher) (Measurement Method F)

The K value is a measure of the average molecular size of high polymer compounds. For the measurement, one percent strength (1 g/100 ml) toluenic polymer solutions were prepared and their kinematic viscosities were determined using a Vogel-Ossag viscometer. Standardization to the viscosity of the toluene gives the relative viscosity, from which the K value can be calculated by the method of Fikentscher (Polymer 8/1967, 381 ff.).

Gel Permeation Chromatography GPC (Measurement Method G):

The figures given for the weight-average molecular weight Mw and the polydispersity PD in this specification relate to the determination by gel permeation chromatography. The determination is made on a 100 μl sample subjected to clarifying filtration (sample concentration 4 g/l). The eluent used is tetrahydrofuran containing 0.1% by volume of trifluoroacetic acid. The measurement is made at 25° C. The precolumn used is a PSS-SDV column, 5μ, $10^3$ Å, ID 8.0 mm×50 mm. Separation is carried out using the PSS-SDV columns, 5μ, $10^3$ Å and also $10^5$ Å and $10^6$ Å, each with ID 8.0 mm×300 mm (columns from Polymer Standards Service; detection by means of Shodex RI71 differential refractometer). The flow rate is 1.0 ml per minute. Calibration takes place against PMMA standards (polymethyl methacrylate calibration).

Solids Content (Measurement Method H)

The solids content is a measure of the fraction of unevaporable constituents in a polymer solution. It is determined gravimetrically, by weighing the solution, then evaporating off the vaporizable fractions in a drying cabinet at 120° C. for two hours, and weighing the residue.

Figure 10:
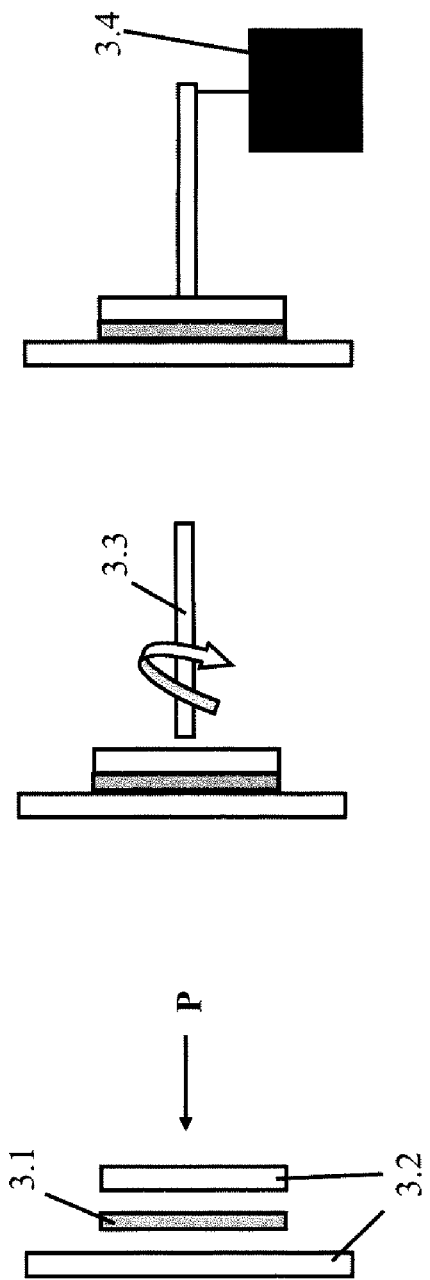
FIG. 10 illustrates a wall hook test method.

Wall Hook Test (Measurement Method L):

FIG. 10 shows the production of the polyacrylate PSA layers (layer A and/or C). A test specimen (3.1) measuring 30 mm×30 mm, fixed between two polished steel plates (3.2), is subjected to a pressure of 0.9 kN (force P) for 1 minute. Thereafter a lever arm (3.3) 9 cm long is screwed into the uppermost steel plate, and is then loaded with a 1000 g weight (3.4). Care is taken to ensure that the time between application of pressure and loading is not more than two minutes ($t \leq 2$ min).

A measurement is made of the holding time, i.e., the time between the hanging and the dropping of the specimen. The result reported is the holding time in minutes as the average from a triplicate determination. The test conditions are 23° C.+/−1° C. and 50% rh+/−5% rh (rh is relative humidity).

Measurements were made in each case on the open side and the lined side.

TABLE 1

| Functional groups of type Z | Conversion into the groups of type X | | | | | | | |
|---|---|---|---|---|---|---|---|---|
| | —NCO | —CNR$^a$R$^b$ | —CR$^a$R$^b$—N (nitrene) | —CO$_2$H | R—SH | R—OH | —RHO | —CR$^a$R$^b$• (radical) |
| —NHCO$_2$R$^1$ | X | X | | | | | | |
| —NH(C=O)NR$^1$R$^2$ | X | X | | | | | | |
| —SO$_2$N$_3$ | | | X | | | | | |
| —CO$_2$C(CH$_3$)$_3$ | | | | X | | | | |
| R—S(C=O)CH$_3$ | | | | | X | | | |
| R—O—C(=O)—CH=CH—CH=CH (with O bridge) | | | | | | | X | |
| -oxazoline | | | | X | | | | |
| —O- and S-acetals | | | | | | X | | |
| —PI | | | | | | | | X |

TABLE 2

| Functional groups of type X | Functional groups of type Y | | | | | | | |
|---|---|---|---|---|---|---|---|---|
| | —CR$^a$=CR$^b$R$^c$ | —OC(=O)CR$^d$=CR$^a$R$^b$ | —OCR$^a$=CR$^b$R$^c$ | —CR$^a$—CR$^b$R$^c$ (epoxide) | —NCO | —NR$^a$R$^b$ | —N$_3$ | —OH |
| —CR$^1$=CR$^2$R$^3$ | X | X | X | | | X | X | |
| —OCR$^1$=CR$^2$R$^3$ | X | X | X | | | | X | |
| —CR$^1$—CR$^2$R$^3$ (epoxide) | | | | X | X | X | | X |
| —NCO | | | | X | | | X | X |
| —NR$^1$R$^2$ | X | X | | | X | X | | |
| —N$_3$ | X | X | X | | | | | |
| —OH | | | | | X | X | | |
| —SH | X | | | | X | X | | |
| —C(=O)R$^1$ | | | | | | X | | |
| —CO$_2$H | | | | | X | X | | X |
| —C(=O)—O—C(=O)R$^1$ | | | | | | X | | X |
| Cyclic acid anhydride | | | | | | X | | X |
| CR$^1$R$^2$• (radical) | X | X | X | X | | | | |
| —C≡CR$^1$ | | | | | | | X | |
| —CR$^1$R$^2$—N (nitrene) | X | X | X | | | | | |
| —CR$^5$R$^6$H | X | X | X | | | | | |
| Oxazoline | | | | | | | | |

| Functional groups of type X | Functional groups of type Y | | | | | | | |
|---|---|---|---|---|---|---|---|---|
| | —SH | —C(=O)R$^a$ | —CO$_2$H | —C(=O)—O—C(=O)R$^a$ | Cyclic acid anhydride | —CR$^a$R$^b$• (radical) | —C≡CR$^a$ | —CR$^a$R$^b$—N (nitrene) | —CR$^e$R$^f$H |
| —CR$^1$=CR$^2$R$^3$ | X | | | | | X | | X | X |
| —OCR$^1$=CR$^2$R$^3$ | | | | | | X | | X | X |
| —CR$^1$—CR$^2$R$^3$ (epoxide) | X | | X | | | X | | | |

TABLE 2-continued

| | 1 | 2 | 3 | 4 | 5 | 6 | 7 | 8 |
|---|---|---|---|---|---|---|---|---|
| —NCO | X | | X | | | | | |
| —NR¹R² | | X | X | X | X | | | |
| —N₃ | | | | | | X | | |
| —OH | | | X | X | X | | | |
| —SH | X | X | | X | X | | | |
| —C(=O)R¹ | X | | | | | | | |
| —CO₂H | | | | X | X | | | |
| —C(=O)—O—C(=O)R¹ | X | | X | | | | | |
| Cyclic acid anhydride | X | | X | | | | | |
| CR¹R²• (radical) | | | | | | X | X | X |
| —C=CR¹ | | | | | | X | X | X |
| —CR¹R²—N (nitrene) | | | | | | X | X | X |
| —CR⁵R⁶H | | | | | | X | X | |
| Oxazoline | X | | X | | | X | X | |

EXAMPLES

Process 1: Preparation of the Functionalized Polymer Particles by Means of Emulsion Polymerization In a 2 liter glass reactor, 1% to 5% by weight of emulsifier are added to the aqueous phase (the addition being based on water) and the mixture is stirred for five to ten minutes until a clear solution forms and the foam has settled. Subsequently 0.1% to 0.5% by weight of sodium peroxodisulfate (NaPS) initiator and 5.0 to 6.0 ppm of sodium hydrogen carbonate buffer were added. Subsequently 15% to 50% by weight of a monomer solution were added and the mixture was stirred until no further phase separation was evident. The monomer mixture is composed to an extent of 60% to 100% by weight of a base monomer and to an extent of 0% to 40% by weight of a functional monomer for the crosslinking, and also 0% to 40% by weight of a di- or triacrylate for the crosslinking of the particles. The jacket temperature of the reactor is set at 80° C. and the emulsion is stirred with a stirrer speed of 200 revolutions/min. The polymerization time is eight hours, after which the particles, after cooling, can be used without further work-up as crosslinkers.

Process 2: Preparation of the Functionalized Core-Shell Particles

The preparation of the core-shell particles is a two-stage one-pot process, the core being prepared in a batch process and the shell in a semi-batch process. Following the preparation of the seed (core), the emulsifier concentration [E] must be lower than the CMC (critical micelle concentration), in order to prevent secondary particle nucleation, which would result in a bimodal or polymodal particle size distribution and would mean that the preparation of the core-shell particles was no longer ensured. For this reason, the monomer mixture for the shell must be metered in slowly, so that, owing to the low emulsifier concentration and the seed latex particles already swollen with monomers, there is no phase separation. Furthermore, initiator, emulsifier and buffer must be metered additionally during the preparation of the shell, in order to ensure a stable operation (no secondary particle nucleation, no phase separation and no sedimentation of the polymer particles). The seed was prepared by process 1. Likewise in accordance with this process, using formula 1, the corresponding critical emulsifier amount [E] was determined, at which secondary particle nucleation is ruled out.

$$[E] \leq \frac{6m_s}{N_a a_e \rho_p d_s V_r}\left(\frac{\rho_p v t}{m_s} + 1\right)^{\frac{2}{3}} + CMC \quad [1]$$

In this formula: $m_s$: mass of dispersed polymer
$N_a$: Avogadro constant
$a_e$: area occupied by one emulsifier molecule on adsorption
$\rho_s$: polymer density
$d_s$: seed particle diameter
$V_r$: reactor volume
$v$: feed rate
$t$: feed time Added dropwise to the dispersion of the seed particles, separately and at a defined rate, were on the one hand the emulsifier, buffer, initiator and water, and on the other hand the monomer mixture. The rate of dropwise addition of the emulsifier mixture was 2 ml/min, and that of the monomer mixture was 1.5 ml/min. The reason for the different dropping rate is that the emulsifier mixture is greater in quantity than the monomer mixture and that there must always be sufficient emulsifier present to stabilize the growing particles and so to prevent coagulation. From the formula for the calculation of the critical emulsifier concentration, a concentration of [E]≤0.03 mol/l (≈2.4 g in 300 ml reaction volume) is calculated for a rate of dropwise addition of v=2 ml/min, a dropwise addition time t of 125 min and a CMC of 10 mmol/l.

Example Organic Functionalized Filler Particles F1-F12

The particles were prepared by process 1, the precise quantities being listed in Table 3. For examples F1 to F12 the following chemicals were used: methyl acrylate (MA, Fluka Chemie GmbH), methyl methacrylate (MMA, Fluka Chemie GmbH), isobornyl acrylate (IBOA, Fluka Chemie GmbH), dipropylene glycol diacrylate (DPGDA, UCB-Chemie), trimethylolpropane triacrylate (TMPTA, Röhm GmbH), hydroxypropyl methacrylate (HPMA, Röhm GmbH), benzoin acrylate, benzophenone acrylate (Ebecryl P36™, UCB-Chemie), sodium peroxodisulfate (NaPS, Merck), sodium hydrogen carbonate (Merck), sodium dodecyl sulfate (SDS, Merck), Hitenol BC 10 (α-sulfo,ω-[1-[(nonylphenoxy)methyl]-2-(2-propenyloxy)ethoxy]-poly-(oxy-1,2-ethanediyl) ammonium sulfate, Dai-Ichi Kogyo Seiyaku Co., Ltd.).

TABLE 3

| | Formula | | | | | |
|---|---|---|---|---|---|---|
| | F1 mass [g] | F2 mass [g] | F3 mass [g] | F4 mass [g] | F5 mass [g] | F6 mass [g] |
| MA | 0 | 40.00 | 35.00 | 0 | 0 | 0 |
| MMA | 50 | 0 | 0 | 47.50 | 45.00 | 40.00 |
| TMPTA | 0 | 5.00 | 5.00 | 0 | 0 | 0 |
| Benzophenone acrylate | 0 | 5.00 | 10.00 | 2.50 | 5.00 | 10.00 |
| NaPS | 0.44 | 0.46 | 0.46 | 0.46 | 0.46 | 0.46 |
| NaHCO$_3$ | 0.14 | 0.14 | 0.14 | 0.14 | 0.14 | 0.14 |
| SDS | 5.00 | 5.00 | 5.00 | 5.00 | 5.00 | 5.00 |
| H$_2$O | 250.00 | 250.00 | 250.00 | 250.00 | 250.00 | 250.00 |

| | Formula | | | | | |
|---|---|---|---|---|---|---|
| | F7 mass [g] | F8 mass [g] | F9 mass [g] | F10 mass [g] | F11 mass [g] | F12 mass [g] |
| MMA | 48.00 | 20.00 | 40.00 | 37.50 | 40.00 | 37.50 |
| IBOA | 3.00 | 1.25 | 0 | 0 | 0 | 0 |
| DPGDA | 6.00 | 1.25 | 0 | 0 | 0 | 0 |
| Benzoin acrylate | 3.00 | 2.00 | 0 | 0 | 0 | 0 |
| HPMA | 0 | 0 | 10.00 | 12.50 | 10.00 | 12.50 |
| NaPS | 0.06 | 0.3 | 0.46 | 0.46 | 0.46 | 0.46 |
| NaHCO$_3$ | 0.07 | 0.07 | 0.14 | 0.14 | 0.14 | 0.14 |
| SDS | 7.50 | 2.50 | 5.00 | 5.00 | 0 | 0 |
| Hitenol BC 10 | 0 | 0 | 0 | 0 | 9.3 | 9.3 |
| H$_2$O | 250.00 | 250.00 | 250.00 | 250.00 | 250.00 | 250.00 |

Stable dispersions were obtained and the particle diameters in the case of all of the fillers were in the range between 30 and 55 nm, which was determined by means of dynamic light scattering.

Example F13-F14

Preparation of Core-Shell Particles

The core-shell particles were prepared by process 2, the precise quantities being listed in Table 4.

TABLE 4

| | F13 | | F14 | |
|---|---|---|---|---|
| | Core 1 mass [g] | Shell 1 mass [g] | Core 2 mass [g] | Shell 2 mass [g] |
| MMA | 50.00 | 30.00 | 20.00 | 18.00 |
| IBOA | 0 | 0 | 1.25 | 0 |
| DPGDA | 0 | 0 | 1.25 | 0 |
| Benzophenone acrylate | 0 | 3.30 | 0 | 0 |
| Benzoin acrylate | 0 | 0 | 0 | 2.00 |
| NaPS | 0.46 | 0.46 | 0.23 | 0.23 |
| NaHCO$_3$ | 0.14 | 0.14 | 0.07 | 0.07 |
| SDS | 5.00 | 2.20 | 2.50 | 2.50 |
| H$_2$O | 250.00 | 250.00 | 250.00 | 250.00 |

By determining the particle size by means of dynamic light scattering it is possible, from the diameter of the core particles and of the core-shell particles, to determine the real increase in volume that comes about in the preparation of the core-shell particles. The theoretical increase in volume can be determined by means of the molar masses of the monomers, their density, and the number of latex particles.

TABLE 5

| Structure | d (measured) [nm] | d (calculated) [nm] |
|---|---|---|
| Core 1 | 31.0 | — |
| Core-shell 1 | 35.9 | 35.5 |
| Core 2 | 37.0 | — |
| Core-shell 2 | 42.9 | 43.2 |

Process 3: Preparation of the Modified PSAs in Solution and Laboratory Specimens A polymer dispersion with a solids content between 40% and 60% by weight was admixed with the respective amounts of resin dispersion, aging agents, functionalized organic fillers (in the present case, in the form of a dispersion) and, if necessary, additional crosslinking reagents, and the mixture was homogenized with a propeller stirrer. In some cases, additionally, further amounts of water were added in order to set a viscosity suitable for the drawdowns. Subsequently the mixture was drawn down with a coating bar on a support (film, paper) with a defined coat weight (weight per unit area) and the laboratory specimen was dried in a drying cabinet at elevated temperature.

Examples Dispersion-Based Adhesive D1-D10

Using process 3, the dispersion-based adhesive Primal 83-B from Röhm & Haas was admixed with the functionalized organic nanoparticles as crosslinkers, the concentration of the fillers being 1%, 5%, and 10% by weight. The solids content is 50% and laboratory specimens are prepared with a coat weight of 50 g/m$^2$ on a PET film 25 µm thick (Laufenberg GmbH). The laboratory specimens were subsequently crosslinked by means of UV radiation with a power of 50 mJ/cm$^2$ (low-pressure mercury lamp, Eltosch GmbH) and the technical adhesive properties such as holding powers and bond strength to steel were measured by measurement methods B1 and C (see Table 6).

TABLE 6

BS: bond strength to steel in [n/cm], HP: holding power in [min]

| Particle concentration [% by weight] | Measurement | no particles | F1/D1 | F2/D2 | F3/D3 | F4/D4 | F5/D5 | F6/D6 | F7/D7 | F8/D8 | F13/D9 | F14/D10 |
|---|---|---|---|---|---|---|---|---|---|---|---|---|
| 0 | BS | 1.56 | — | — | — | — | — | — | — | — | — | — |
| 0 | HP | 316 | — | — | — | — | — | — | — | — | — | — |
| 1 | BS | — | 1.50 | 1.55 | 1.42 | 1.38 | 1.39 | 1.66 | 1.32 | 1.24 | 1.49 | 1.51 |
| 1 | HP | — | 384 | 560 | 574 | 9079 | 6281 | >10000 | 996 | 1058 | 640 | 2832 |
| 5 | BS | — | 1.33 | 1.44 | 1.41 | 1.10 | 1.15 | 1.21 | 1.16 | 1.12 | 1.49 | 1.48 |
| 5 | HP | — | 401 | 1230 | 1309 | 5482 | >10000 | >10000 | 1699 | 1954 | 2004 | 4905 |
| 10 | BS | — | 1.18 | 1.02 | 1.15 | 0.46 | 0.12 | 0.09 | 1.01 | 0.96 | 1.11 | 1.15 |
| 10 | HP | — | 408 | 5601 | 5021 | 4146 | 5071 | >10000 | 2110 | 2356 | 3985 | 3675 |

TABLE 7

BS: bond strength to steel in [N/cm], MST: microshear travel in [μm]

| Particle concentration [% by weight] | Measurement | Comparison 1 IcapLink X 5 | Comparison 2 Epocros WS-700 | F9/D11 | F10/D12 | F11/D13 | F12/D14 | Epocros K2020/ D15 | Epocros K2030/ D16 |
|---|---|---|---|---|---|---|---|---|---|
| 1 | BS | 3.3 | 3.5 | 3.7 | 3.4 | 3.6 | 3.3 | 4.1 | 3.4 |
| 1 | MST | 80 | 500 | 66 | 60 | 72 | 58 | 81 | 88 |
| 2.5 | BS | — | — | 3.2 | 2.9 | 3.2 | 2.9 | 3.6 | 3.2 |
| 2.5 | MST | — | — | 54 | 44 | 56 | 42 | 52 | 45 |

Examples Dispersion-Based Adhesive D11-D16

Using process 3, the dispersion-based adhesives Robond PS-8120 (Röhm & Haas) with 30% by weight of Snowtack SE 780 G tackifier resin (Röhm & Haas) were admixed with the functionalized organic nanoparticles as crosslinkers (F9 to F12) and also Epocros K2020 E and Epocros K2030 E (Nippon Shokubai), the concentration of the fillers being 1% and 2.5% by weight. In the case of the crosslinkers F9 to F12, 0.8% by weight of the blocked isocyanate IcapLink X5 (ICAP-SIRA) was added additionally as a bridge former between the polymer and the organic nanoparticles. As a comparison sample, the respective dispersion-based adhesives were also admixed only with IcapLink X5, which per se is also able to lead to crosslinking, and with the crosslinker Epocros WS-700, which is a water-soluble form of Epocros K2020 E and has no particle morphology. The solids content is 50%, and laboratory specimens were produced with a coat weight of 50 g/m² on a PET film 25 μm thick (Laufenberg GmbH) and then dried at 105° C. for 5 minutes. The technical adhesive properties such as microshear travel and bond strength to steel were measured by measurement methods C and D (see Table 7).

Preparation of the Starting Polymers for Examples PSA B1 to B10

The preparation of the starting polymers is described below. The polymers investigated are prepared conventionally via a free-radical polymerization in solution.

Base Polymer P1

A reactor conventional for free-radical polymerizations was charged with 45 kg of 2-ethylhexyl acrylate, 45 kg of n-butyl acrylate, 5 kg of methyl acrylate, 5 kg of acrylic acid and 66 kg of acetone/isopropanol (92.5:7.5). After nitrogen gas had been passed through the reactor for 45 minutes, with stirring, the reactor was heated to 58° C. and 50 g of AIBN (2,2'-azobis(2-methylpropionitrile), Vazo® 64, DuPont) were added. Subsequently the external heating bath was heated to 75° C. and the reaction was carried out constantly at this external temperature. After 1 h a further 50 g of AIBN were added, and after 4 h the batch was diluted with 20 kg of acetone/isopropanol mixture. After 5 h and again after 7 h, initiation was repeated with 150 g portions of bis(4-tert-butylcyclohexyl) peroxydicarbonate (Perkadox® 16 Akzo Nobel). After a reaction time of 22 h the polymerization was discontinued and the batch was cooled to room temperature. The polyacrylate has a conversion of 99.6%, a K value of 59, a solids content of 54%, an average molecular weight of Mw=557 000 g/mol, polydispersity PD (Mw/Mn)=7.6.

Base Polymer P2

A reactor conventional for free-radical polymerizations was charged with 47.5 kg of 2-ethylhexyl acrylate, 47.5 kg of n-butyl acrylate, 5 kg of acrylic acid, 150 g of dibenzoyl trithiocarbonate and 66 kg of acetone. After nitrogen gas had been passed through the reactor for 45 minutes, with stirring, the reactor was heated to 58° C. and 50 g of AIBN (Vazo® 64, DuPont) were added. Subsequently the external heating bath was heated to 75° C. and the reaction was carried out constantly at this external temperature. After 1 h a further 50 g of AIBN were added, and after 4 h the batch was diluted with 10 kg of acetone. After 5 h and again after 7 h, an addition was made of 150 g portions of bis(4-tert-butylcyclohexyl) peroxydicarbonate. After a reaction time of 22 h the polymerization was discontinued and the batch was cooled to room temperature.

The polyacrylate has a conversion of 99.5%, a K value of 41.9, a solids content of 56.5%, an average molecular weight of Mw=367 000 g/mol, polydispersity PD (Mw/Mn)=2.8.

Base Polymer P3

In the same way as in example P1, 68 kg of 2-ethylhexyl acrylate, 25 kg of methyl acrylate and 7 kg of acrylic acid were polymerized in 66 kg of acetone/isopropanol (92.5:7.5).

The polyacrylate has a conversion of 99.7%, a K value of 51, a solids content of 55.0%, an average molecular weight of Mw=657 000 g/mol, polydispersity PD (Mw/Mn)=8.2.

Process 4: Concentration/Preparation of the Hotmelt PSAs

The acrylate copolymers (base polymers P1 to P3) are very largely freed from the solvent by means of a single-screw extruder (concentrating extruder, Berstorff GmbH, Germany) (residual solvent content≤0.3% by weight; cf. the individual examples). The parameters given here by way of example are those for the concentration of base polymer P1. The speed of the screw was 150 rpm, the motor current 15 A, and a throughput of 58.0 kg liquid/h was realized. For concentration, a vacuum was applied at three different domes. The reduced pressures were, respectively, between 20 mbar and 300 mbar. The exit temperature of the concentrated hotmelt is approximately 115° C. The solids content after this concentration step was 99.8%.

Process 5: Preparation of the Modified Hotmelt PSAs and Viscoelastic Carriers The acrylate hotmelt PSA prepared in accordance with process 1 as elucidated above were conveyed directly into a downstream Welding twin-screw extruder (Welding Engineers, Orlando, USA; model 30 MM DWD; screw diameter 30 mm, length of screw 1=1258 mm; length of screw 2=1081 mm; 3 zones). Via a solids metering system, the resin Dertophene® T110 (DRT Resins) was metered in zone 1 and mixed in homogeneously. In the case of the adhesive for examples MT 1 to MT 7, no resin was metered in. In the case of examples MT 3, MT 4 and MT 5, the corresponding adjuvants were metered in via the solids metering system and were mixed in homogeneously. The parameters given here by way of example are those for resin compounding with the base polymer P1. Speed was 451 rpm, the motor current 42 A, and a throughput of 30.1 kg/h was realized. The temperatures in zones 1 and 2 were each 105° C., the melt temperature in zone 1 was 117° C., and the adhesive temperature on exit (zone 3) was 100° C.

Process 6: Preparation of the Inventive Adhesive Tapes, Blending with the Functionalized Particles Serving as Crosslinkers (in the Form of a Dispersion), and Coating The acrylate hotmelt PSAs prepared by processes 4-5 were melted in a feeder extruder (single-screw conveying extruder from Troester GmbH & Co KG, Germany) and using this extruder were conveyed as a polymer melt into a twin-screw extruder (Leistritz, Germany, ref. LSM 30/34). The assembly is heated electrically from the outside and is air cooled by a number of fans, and is designed such that, with effective distribution of the crosslinker-accelerator system in the polymer matrix, there is at the same time a short residence time ensured for the adhesive in the extruder. For this purpose the mixing shafts of the twin-screw extruder were arranged in such a way that conveying elements are in alternation with mixing elements. The addition of the respective crosslinkers is made with suitable metering equipment, where appropriate at two or more points (FIG. 8: metering points 1.1 and 1.2; additionally: 1.3=twin-screw extruder, BW=web roll; RW=doctor roll of a two-roll applicator; the latter is represented here only by way of example and without restriction) and, where appropriate, using metering assistants into the unpressurized conveying zones of the twin-screw extruder.

Figure 8:
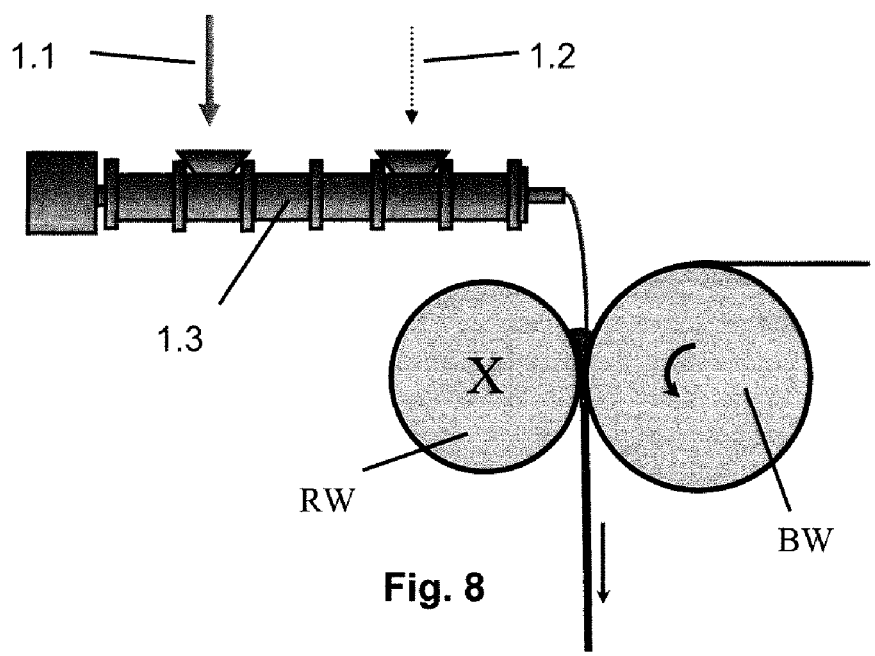
FIG. 8 illustrates coating onto a carrier in web form.

Following exit of the ready-compounded adhesive, i.e., of the adhesive blended with the crosslinker system, from the twin-screw extruder (exit: circular die, 5 mm diameter), coating takes place in accordance with FIG. 8 onto a carrier material in web form. The time between metered addition of the crosslinker system and the shaping or coating procedure is identified as the processing time. The processing time indicates the period within which the adhesive blended with the crosslinker system, or the viscoelastic carrier layer, can be coated with a visually good appearance (gel-free, speck-free). Coating takes place with web speeds between 1 m/min and 20 m/min; the doctor roll (RW) of the 2-roll applicator is not driven.

In the examples below and in Tables 8 to 10, the formulations employed, the production parameters and the properties achieved are each described in more detail.

Examples B1 to B3

The base polymer P1 is polymerized in accordance with the polymerization process described, concentrated by process 4 (solids content 99.8%) and then blended by process 5 with Dertophene® T110 resin (DRT Resins). This resin-modified acrylate hotmelt adhesive was then compounded by process 6 continuously with the filler dispersions F4 to F6.

Detailed description: in the twin-screw extruder described in process 6, a total mass flow consisting of 70 parts of polymer P1 and 30 parts of Dertophene® T110 resin of 533.3 g/min (corresponding to 373 grams of the pure polymer per minute) was blended with 3.73 g/min of the filler dispersions (corresponding to 1% by weight based on polymer). The operational parameters are summarized in Tab. 8.

The processing time of the completed compound was more than 7 min with an average adhesive temperature of 125° C. after departing from the Leistritz twin-screw extruder. Coating takes place on a 2-roll applicator in accordance with FIG. 8, with roll surface temperatures of 100° C. in each case and with a coat weight of 86 g/m², onto 23 μm PET film. Since all of the samples contain a UV-activable filler (latex particles with benzophenone acrylate), they were all additionally irradiated with a downstream medium-pressure mercury UV lamp (power 30-160 W/cm, $N_2$ inertization, Adphos-Eltosch). Irradiation in these examples took place at 50 W/cm.

The technical adhesive data of examples B1 to B3 are summarized in Table 9. This example shows that very high-performance adhesive tapes can be produced, featuring, among other qualities, good bond strengths on polar and apolar substrates (steel and polyethylene) and good cohesive properties even under the influence of temperature.

Examples B4 to B6

The base polymer P2, concentrated by process 4 and blended by process 5 with Dertophene® T110 resin (residual solvent content: 0.1% by weight) was compounded by process 6 in the same way as in example B1 in a twin-screw extruder with the filler dispersions F4 to F6 and used for coating. Contrastingly, in process 2, the filler, Mikrosöhl® 40 chalk was additionally incorporated, for which purpose the mixing screw geometries of the twin-screw extruder used were adapted accordingly.

In the same way as in examples B1 to B3, 1.5% by weight of the multifunctional latex particles F4 to F6 (based on the acrylate copolymer) were added by process 6. The extruder speed of the Leistritz twin-screw extruder was 125 revolutions per minute, the mass throughput 16.4 kg/h. The processing time was more than 7 min with an effective adhesive temperature of approximately 110° C. after departing from the extruder. As a result of the addition of the chalk filler, the average adhesive temperature rose to 117° C. Using the roll applicator as per FIG. 1, coating took place with a coat weight of 101 g/m² onto 23 μm PET film. The adhesive was subsequently irradiated with a UV dose of 100 W/cm.

The technical adhesive data are listed in Table 9.

Examples B7 to B9

The polymerization of the polymer P3 used, the concentration, the resin blending and the incorporation of the crosslinker-accelerator system, and the coating, take place substantially as described in example 1. 0.5% by weight of the multifunctional latex particles F4 to F6 was added (based on the acrylate copolymer).

The average adhesive temperature following exit from the compounding extruder was situated at a temperature of approximately 110° C. The adhesive was irradiated with a UV dose of 50 W/cm.

Further details on operational parameters set are found in Table 8, and further details on technical adhesive outcomes are found in Table 9.

Example B10 (Comparative Example)

The polymerization of the polymer P1 used, the concentration, the resin blending, the incorporation of the crosslinker component (latex particles) and the coating take place substantially as described in example 1, but with the following variation:

The filler F1 used here possesses no functional groups capable of crosslinking with the acrylic acid in polymer P1.

1% by weight of the filler particles was added, and the adhesive was subsequently irradiated likewise with a UV dose of 50 W/cm.

The shear travels measured by measurement method D, "microshear travel", are found after 25 days of storage at room temperature to be greater than 2000 μm, and the elastic component is 0%, which means that there has been no crosslinking, or no significant crosslinking.

Repetition of the Measurements after Temperature Storage:

This adhesive tape specimen crosslinks neither after 3-month storage at 70° C. nor after 1-hour storage at 140° C. in a heating cabinet. Measurement after these storage periods was carried out again with the "microshear travel" measurement method D; the shear travels were found to be greater than 2000 μm. On the basis of the absence of crosslinking, no further technical adhesive tests are undertaken.

Further details on the operational parameters set can be found in Table 8 in each case in line B10.

When the functional organic nanoparticles of the invention are used, the crosslinking reaction via the functional groups of the polyacrylate proceeds only after the functional groups of the particles have been converted by means of UV radiation, and then proceeds even without supply of heat under standard conditions (room temperature). In general, after a storage time of 5 days to 14 days, the crosslinking reaction has been concluded to an extent sufficient for a functional adhesive tape or functional carrier layer to be present. The final crosslinking state and hence the ultimate cohesion of the adhesive is achieved, depending on the UV dose selected, after a storage time of some minutes to 100 days, in an advantageous form after some minutes to 14 days' storage time at room temperature; if the storage temperature is higher, an earlier result is expected.

The crosslinking increases the cohesion of the adhesive and hence also the shear strength. These groups are known to be very stable. This permits very aging-stable and heat-resistant self-adhesive tapes.

In contrast, it is apparent from viewing the comparative example, example B10, that crosslinking is unsuccessful if nonfunctionalized nanoparticles, rather than the functionalized organic nanoparticles of the invention, and no further crosslinkers otherwise are used and the adhesive is subsequently irradiated with UV radiation.

TABLE 8

Operational parameters

| Example/ filler [ ] | Base polymer Polymer [ ] | K value [ ] | Compounding by process 2 Fraction of adjuvants | Throughput of total mass TSE [kg/h] | TSE speed [1/min] | Nominal power consumption of TSE [A] | Initial pressure TSE [A] | Temperature of adhesive after TSE [bar] | Doctor roll RW | Coating roll BW | Processing time [min] |
|---|---|---|---|---|---|---|---|---|---|---|---|
| B1/F4 | P1 | 59 | 70 parts polymer P1 + 30 parts resin DT 110 | 32.0 | 110 | 15 | 10 | 125 | 100 | 100 | greater than 7 |
| B2/F5 | P1 | 59 | 70 parts polymer P1 + 30 parts resin DT 110 | 32.0 | 110 | 15 | 10 | 120 | 100 | 100 | greater than 7 |
| B3/F6 | P1 | 59 | 70 parts polymer P1 + 30 parts resin DT 110 | 32.0 | 110 | 15 | 10 | 118 | 100 | 100 | greater than 7 |
| B4/F4 | P2 | 41.9 | 49 parts polymer P2 + 21 parts resin DT 110 + 30 parts Mikrosohl ® 40 chalk | 16.0 | 125 | 10 | 9 | 115 | 100 | 100 | greater than 7 |
| B5/F4 | P2 | 41.9 | 70 parts polymer P2 + 30 parts resin DT 110 | 16.4 | 125 | 7 | 5 | 108 | 100 | 100 | greater than 7 |
| B6/F6 | P2 | 41.9 | 70 parts polymer P2 + 30 parts resin DT 110 | 16.4 | 125 | 7 | 6 | 109 | 100 | 100 | greater than 7 |
| B7/F4 | P3 | 69.5 | 70 parts polymer P1 + 30 parts resin DT 110 | 12.0 | 110 | 8 | 10 | 110 | 100 | 100 | greater than 7 |
| B8/F5 | P3 | 69.5 | 70 parts polymer P1 + 30 parts resin DT 110 | 12.0 | 110 | 8 | 10 | 111 | 100 | 100 | greater than 7 |
| B9/F6 | P3 | 69.5 | 70 parts polymer P1 + 30 parts resin DT 110 | 12.0 | 110 | 8 | 10 | 113 | 100 | 100 | greater than 7 |
| B10/F1 | P1 | 59 | 70 parts polymer P1 + 30 parts resin DT 110 | 32.0 | 110 | 15 | 10 | 125 | 100 | 100 | greater than 7 |

TABLE 9

Technical adhesive outcomes

| Example/filler [ ] | Base polymer Polymer [ ] | K value [ ] | Compounding process 2 Fraction of adjuvants | Carrier film [ ] | Coat weight [g/m²] | Bond strength to steel [N/cm] | Bond strength to PE [N/cm] | Holding power 10 N, 23° C. [min] | Holding power 10 N, 70° C. [min] | MST 40° C./ elast. compound. [µm]/[%] |
|---|---|---|---|---|---|---|---|---|---|---|
| B1/F4 | P1 | 59 | 70 parts polymer P1 + 30 parts resin DT 110 | 23 µm PET film | 86 | 9.8 | 4.6 | 1600 | 15 | 512/67 |
| B2/F5 | P1 | 59 | 70 parts polymer P1 + 30 parts resin DT 110 | 23 µm PET film | 85 | 8.5 | 3.4 | >10000 | 80 | 160/75 |
| B3/F6 | P1 | 59 | 70 parts polymer P1 + 30 parts resin DT 110 | 23 µm PET film | 86 | 8.1 | 2.5 | >10000 | 560 | 70/90 |
| B4/F4 | P2 | 41.9 | 49 parts polymer P3 + 21 parts resin DT 110 + 30 parts Mikrosohl ® 40 chalk | 23 µm PET film | 98 | 8.5 | 2.9 | 3800 | 280 | 230/73 |
| B5/F4 | P2 | 41.9 | 70 parts polymer P1 + 30 parts resin DT 110 | 23 µm PET film | 100 | 9.8 | 3.1 | 1700 | 200 | 350/70 |
| B6/F6 | P2 | 41.9 | 70 parts polymer P1 + 30 parts resin DT 110 | 23 µm PET film | 101 | 7.3 | 1.2 | >10000 | 4200 | 50/92 |
| B7/F4 | P3 | 69.5 | 70 parts polymer P1 + 30 parts resin DT 110 | 23 µm PET film | 101 | Tests not possible, formulation has not crosslinked | | | | more than 2000/0 |
| B8/F5 | P3 | 69.5 | 70 parts polymer P1 + 30 parts resin DT 110 | 23 µm PET film | 105 | 9.5 | 2.2 | 1200 | 12 | 960/72 |
| B9/F6 | P3 | 69.5 | 70 parts polymer P1 + 30 parts resin DT 110 | 23 µm PET film | 102 | 8.6 | 2.1 | >10000 | 5670 | 220/88 |
| B10/F1 | P1 | 59 | 70 parts polymer P1 + 30 parts resin DT 110 | 23 µm PET film | 85 | Tests not possible, formulation has not crosslinked | | | | more than 2000/0 |

Bond strength to steel/PE = measurement method B1,
Holding power = measurement method C
MST = microshear travel = measurement method D,
DT 100 = Dertophene ® T110

Examples Viscoelastic Carriers and Three-Layer Constructions
I. Preparation of the Pressure-Sensitive Adhesive
Polyacrylate PSA 1 (PA1):

A 100 l glass reactor conventional for free-radical polymerizations was charged with 2.8 kg of acrylic acid, 8.0 kg of methyl acrylate, 29.2 kg of 2-ethylhexyl acrylate and 20.0 kg of acetone/isopropanol (95:5). After nitrogen gas had been passed through it for 45 minutes, with stirring, the reactor was heated to 58° C. and 20 g of AIBN (Vazo® 64, DuPont) were added. Subsequently the external heating bath was heated to 75° C. and the reaction was carried out constantly at this external temperature. After a reaction time of 1 h a further 20 g of AIBN were added. After 4 h and 8 h the batch was diluted each time with 10.0 kg of acetone/isopropanol (95:5) mixture. To reduce the residual initiators, portions of 60 g of bis(4-tert-butylcyclohexyl) peroxydicarbonate were after 8 h and again after 10 h. The reaction was discontinued after a reaction time of 24 h and the mixture was cooled to room temperature. Subsequently the polyacrylate was blended with 0.4% by weight of aluminum(III) acetylacetonate (3% strength solution in isopropanol), diluted to a solids content of 30% with isopropanol and then coated from solution onto a siliconized release film (50 µm polyester). (Coating speed 2.5 m/min, drying tunnel 15 m, temperatures: zone 1: 40° C., zone 2: 70° C., zone 3: 95° C., zone 4: 105° C.) the coat weight was 50 g/m².

II. Production of the Viscoelastic Carriers
Preparation of the Starting Polymers for the Viscoelastic Carriers of Examples VT 1 to 5

Described below is the preparation of the starting polymers. The polymers investigated are prepared conventionally by a free-radical polymerization in solution.

Base Polymer HPT 1

A reactor conventional for free-radical polymerizations was charged with 40 kg of 2-ethylhexyl acrylate, 40 kg of n-butyl acrylate, 15 kg of methyl acrylate, 5 kg of acrylic acid and 67 kg of acetone/isopropanol (95:5). After nitrogen gas had been passed through it for 45 minutes, with stirring, the reactor was heated to 58° C. and 40 g of AIBN (Vazo® 64, DuPont) were added. Subsequently the external heating bath was heated to 75° C. and the reaction was carried out constantly at this external temperature. After 1 h a further 60 g of AIBN were added and after 4 h the batch was diluted with 14 kg of acetone/isopropanol mixture. After 5 h and again after 7 h, initiation was repeated with 150 g portions of bis(4-tert-butylcyclohexyl) peroxydicarbonate (Perkadox® 16, Akzo Nobel). After a reaction time of 22 h the polymerization was discontinued and the batch was cooled to room temperature. The polyacrylate has a K value of 57, a solids content of 54.6% and an average molecular weight of Mw=714 000 g/mol, polydispersity PD (Mw/Mn)=7.6.

Base Polymer HPT 2

A reactor conventional for free-radical polymerizations was charged with 65 kg of 2-ethylhexyl acrylate, 30 kg of tert-butyl acrylate, 5 kg of acrylic acid, 100 g of benzyl dithiobenzoate and 67 kg of acetone. After nitrogen gas had been passed through it for 45 minutes, with stirring, the reactor was heated to 58° C. and 50 g of AIBN (Vazo® 64, DuPont) were added. Subsequently the external heating bath was heated to 75° C. and the reaction was carried out constantly at this external temperature. After 1 h a further 50 g of AIBN were added and after 4 h the batch was diluted with 10 kg of acetone. After 5 h and again after 7 h, an addition was made of 150 g portions of bis(4-tert-butylcyclohexyl) peroxydicarbonate (Perkadox® 16, Akzo Nobel). After a reaction time of 22 h the polymerization was discontinued and the batch was cooled to room temperature. The polyacrylate has a K value of 49.2, a solids content of 59.2% and an average molecular weight of Mw=379 000 g/mol, polydispersity PD (Mw/Mn)=3.1.

Base Polymer HPT 3

A reactor conventional for free-radical polymerizations was charged with 68 kg of 2-ethylhexyl acrylate, 25 kg of methyl acrylate, 7 kg of acrylic acid and 66 kg of acetone/isopropanol (95:5). After nitrogen gas had been passed through it for 45 minutes, with stirring, the reactor was heated to 58° C. and 40 g of AIBN (Vazo® 64, DuPont) were added. Subsequently the external heating bath was heated to 75° C. and the reaction was carried out constantly at this external temperature. After 1 h a further 60 g of AIBN were added. After 4 h the batch was diluted with 20 kg of acetone/isopropanol (95:5). After 5 h and again after 7 h, an addition was made of 150 g portions of bis(4-tert-butylcyclohexyl) peroxydicarbonate (Perkadox® 16, Akzo Nobel). After a reaction time of 22 h the polymerization was discontinued and the batch was cooled to room temperature.

The polyacrylate has a K value of 55, a solids content of 55% and an average molecular weight of Mw=579 000 g/mol, polydispersity PD (Mw/Mn)=7.9.

Concentration and Compounding of the Base Polymers HPT 1 to HPT 3 for the Viscoelastic Carriers:

The acrylate copolymers HPT 1 to HPT 3 are freed from the solvents in the same way as for process 4 and where appropriate are subsequently admixed with additives in the same way as for process 5; cf. the individual examples.

Process 7: Production of the 3-Layer Constructions by Means of 2-Roll Calender

Figure 9:
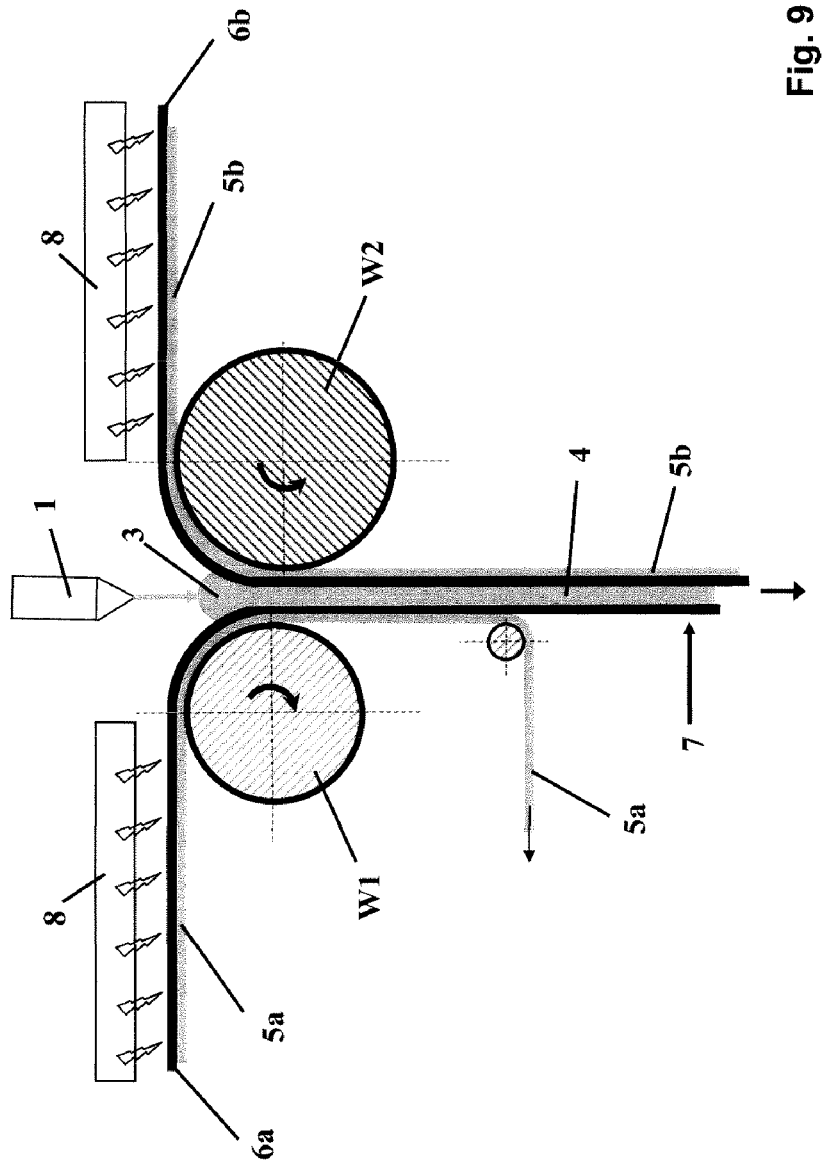
FIG. 9 illustrates production of the 3-layer constructions by means of a 2-roll calender.

The process was carried out as described in FIG. 9. Using distributor nozzle (1), the viscoelastic composition (3), already compounded with the functionalized organic nanoparticles and, where appropriate, further fillers, is supplied to the roll nip. The shaping of the viscoelastic composition to a viscoelastic film takes place between the calender rolls (W1) and (W2) in the roll nip between two self-adhesive compositions (6a, 6b), which in turn are supplied coated onto antiadhesively furnished carrier materials (5a, 5b). In this case there is, simultaneously, shaping of the viscoelastic composition to the set layer thickness, and coating with the two self-adhesive compositions supplied. In order to improve the anchoring of the self-adhesive compositions (6a, 6b) on the shaped viscoelastic carrier layer (4), the self-adhesive compositions, before being supplied to the roll nip, are corona-treated by means of corona station (8) (corona unit from Vitaphone, Denmark, 100 W·min/m²). As a result of this treatment, following the production of the three-layer assembly, there is improved chemical attachment to the viscoelastic carrier layer.

The web speed on passing through the coating unit is 30 m/min.

After leaving the roll nip, an antiadhesive carrier (5a) is lined if appropriate, and the completed three-layer product (7) is wound up with the remaining second antiadhesive carrier (5b).

Presented below are specific examples relating to the production of the self-adhesive compositions and the coating of the adhesive tapes of the invention, without any intention that the invention should be unnecessarily restricted by the choice of the specified formulations, configurations and operational parameters.

Examples MT 1 and MT 2

The base polymer HPT 1 was concentrated by process 4 (solids content 99.7%) and then compounded by process 5 in a twin-screw extruder continuously with the latex particles F9 and F10 (2.0% by weight based on the polyacrylate). The modified filler particles F9 and F10 were supplemented with 0.8% by weight of the aliphatic polyisocyanate Desmodur XP 2410 (Bayer Material Science) as a crosslinking component.

Coating to produce the viscoelastic carriers VT1 and VT2 from the base polymer HPT 1 between the composition layers PA 1 coated beforehand onto siliconized polyester films takes place on a two-roll applicator at roll temperatures of 100° C. by process 7. The layer thickness of the viscoelastic carriers VT1 and VT2 was 800 µm. The corona power was 100 W·min/m². After 7 days' room temperature storage, the technical adhesive data were measured for both the open and the lined sides. The data of examples MT 1 and MT 2 are summarized in Table 10.

Examples MT 3 and MT 4

The base polymer HPT 2 was concentrated by process 4 (solids content 99.8%) and then compounded by process 5 in a twin-screw extruder continuously with the latex particles F9 and F10 (2.0% by weight based on the polyacrylate). The modified filler particles F9 and F10 were supplemented with 0.8% by weight of the aliphatic polyisocyanate Desmodur XP 2410 (Bayer Material Science) as a crosslinking component. Subsequently, in the same way as for examples MT 1 and MT 2, coating took place by process 7 between composition layers PA 1, each coated beforehand onto siliconized polyester films, on a two-roll applicator. The layer thickness of the viscoelastic carriers VT3 and VT4 was 850 µm. The corona power was 100 W·min/m². After 7 days' room temperature storage, the technical adhesive data were measured for both the open and the lined sides. The data of examples MT 3 and MT 4 are summarized in Table 10.

Examples MT 5 and MT 6

The base polymer HPT 2 was concentrated by process 4 (solids content 99.7%) and then compounded by process 5 with 6.5% by weight of hollow glass beads Q-CEL® 5082 (from Potters Industries) and compounded continuously by process 6 in a twin-screw extruder with the organic filler particles F10 (functionalized) and F1 (nonfunctionalized) (2.5% by weight based on the polyacrylate) and diethylenetriamine (Epikure® 3223; 0.80% by weight based on the polyacrylate). The filler particles F1 and F10 were supplemented with 1.0% by weight of the aliphatic polyisocyanate Desmodur XP 2410 (Bayer Material Science) as a crosslinking component.

Coating to produce the viscoelastic carriers VT5 and VT6 between the composition layers PA 1 coated beforehand onto siliconized polyester films takes place on a two-roll applicator at roll temperatures of 100° C. by process 7. The layer thickness of the viscoelastic carriers VT5 and VT6 was 800 µm. The corona power was 100 W·min/m². After 7 days' room temperature storage, the technical adhesive data were measured for both the open and the lined sides. The data of examples MT 5 and MT 6 are summarized in Table 10.

Example MT 7

The base polymer HPT 3 was concentrated by process 4 (solids content 99.7%) and then blended by process 5 with 3% by weight of unexpanded hollow microbeads Expancel® 092 DU 40 (from Akzo Nobel, Germany) and compounded continuously by process 6 in a twin-screw extruder with the functionalized organic nanoparticles F10 (2.5% by weight based on the polyacrylate). The filler particles F10 were supplemented with 1.0% by weight of the aliphatic polyisocyanate Desmodur XP 2410 (Bayer Material Science) as a crosslinking component.

Heat was introduced to expand the mixture in the extruder and the expanded mixture was subsequently coated between the composition layers PA 1, coated beforehand onto siliconized polyester films, with coating taking place by process 7 at roll temperatures of 130° C. The layer thickness of the expanded viscoelastic carrier VT7 was 1000 µm. The corona power for the pretreatment of the PSA layers was 100 W·min/m². After 7 days' room temperature storage, the technical adhesive data were measured for both the open and the lined sides. The data of example MT 7 are summarized in Table 10.

As is apparent from the data in Table 4, the inventively double-sidedly adhesive assembly tapes have very good technical adhesive data. A particularly positive feature is the balanced bonding profile of each of the sides. For a given layer of adhesive on both sides of the adhesive tape, these sides give virtually the same technical adhesive data. This shows the homogeneous crosslinking through the layer. This is surprising for the person skilled in the art. Moreover, these three-layer adhesive tapes do not exhibit delamination. The anchoring of the layers to one another is very good by virtue of the corona treatment of the PSA layers and the aftercrosslinking of the adjacent viscoelastic carrier layer.

groups Z of the functionalized polymeric particles, by supply of ultrasound energy, into functional groups X which are capable of reacting with the functional groups Y of the polymer, and reacting the functional groups X of the functionalized polymeric particles with the functional groups Y of the polymer to crosslink said polymer with said functionalized polymeric particles, wherein the functionalized polymeric particles are prepared by emulsion polymerization, miniemulsion polymerization or microemulsion polymerization, or by dispersion polymerization, wherein the functionalized polymeric particles are present in a concentration range of 0.1% to 15% by weight based on the polymer, and further wherein the ultrasound energy is supplied at a power range between 50 W and 16 kW and a frequency range from 20 kHz to 2 MHz.

2. Process according to claim 1, wherein the functionalized polymeric particles additionally have functional groups $X_a$, where, in the process, optionally before the conversion of the functional groups Z into the functional groups X, a partial crosslinking step takes place which comprises reacting the functional groups $X_a$ with some of the functional groups Y.

3. Process according to claim 1, wherein the energy supplied further comprises thermal energy, electromagnetic radiation, and/or particulate radiation.

TABLE 10

Product construction and technical adhesive data of the three-layer constructions

| | Three-layer product | | | | Carrier thickness | Bond strength to steel [N/cm] | | Holding power 10 N 23° C. [min] | | Wall hook test [min] | | MST 40° C./ elast. comp. |
|---|---|---|---|---|---|---|---|---|---|---|---|---|
| Example | PSA 1 | Filler | Viscoelastic carrier layer | PSA 2 | [µm] | open side | lined side | open side | lined side | open side | lined side | [µm]/[%] |
| MT 1 | 50 g/m² PA 1 | F9 | VT 1 | 50 g/m² PA 1 | 800 | 14.2 | 13.7 | >10000 | >10000 | 2580 | 2795 | 950/76 |
| MT 2 | 50 g/m² PA 1 | F10 | VT 2 | 50 g/m² PA 1 | 800 | 14.0 | 13.6 | >10000 | >10000 | 3754 | 3900 | 720/85 |
| MT 3 | 50 g/m² PA 1 | F9 | VT 3 | 50 g/m² PA 1 | 850 | 11.8 | 11.6 | 7850 | 6970 | 4876 | 4456 | 877/78 |
| MT 4 | 50 g/m² PA 1 | F10 | VT 4 | 50 g/m² PA 1 | 850 | 11.5 | 11.4 | >10000 | >10000 | 5362 | 5512 | 645/84 |
| MT 5 | 50 g/m² PA 1 | F10 | VT 5 | 50 g/m² PA 1 | 800 | 13.7 | 14.2 | >10000 | >10000 | 9320 | 9360 | 546/78 |
| MT 6 | 50 g/m² PA 1 | F1 | VT 6 | 50 g/m² PA 1 | 800 | 10.7 | 10.6 | 2456 | 2345 | 1540 | 1468 | 1067/69 |
| MT 7 | 50 g/m² PA 1 | F10 | VT 7 | 50 g/m² PA 1 | 1000 | 13.5 | 13.6 | >10000 | >10000 | >10000 | >10000 | 745/78 |

Bond strength to steel = measurement method B2
Holding power = measurement method C
Wall hook test = measurement method D The invention claimed:

1. Process for preparing a pressure-sensitive adhesive, the process comprising the steps of:

providing a pressure-sensitive adhesive formulation comprising a polymer, having reactive centers comprising functional groups Y, and functionalized polymeric particles, wherein the functionalized polymeric particles comprise at least one polymeric base unit, wherein the polymeric base unit is formed from monomers comprising monomers having functional groups Z which themselves do not react with functional groups Y, but which are configured to be converted to functional groups X which are reactable with functional groups Y, wherein the functionalized polymeric particles have particle diameters that are less than 100 nm, converting, after the pressure-sensitive adhesive formulation has been dried, at least some of the functional 4. Process according claim 1, wherein the functionalized polymeric particles are present as a dispersion in water.

5. Process according to claim 1, wherein the functionalized polymeric particles are composed at least partly of the same monomers as the polymer.

6. Process according to claim 1, wherein the functionalized polymeric particles are spherical.

7. Process according to claim 1, wherein at least part of said functionalized polymeric particles are in the form of hollow particles and/or core-shell particles.

8. Process according to claim 1, wherein the conversion of the functional groups Z into the functional groups X and the reaction with the functional groups Y proceed simultaneously.

9. Process according to claim 1, wherein the conversion of the groups Z into the groups X comprises removal of protective groups or deblocking.

10. The process of claim 1, wherein prior to converting said functional groups Z to said functional groups X, a formulation of said polymer having reactive centers comprising functional groups Y and said functionalized polymeric particles is applied to a support as a coating layer and dried.

11. Process according to claim 10, wherein the glass transition temperature $T_g$ of the functionalized polymeric particles is higher than the temperature at which said formulation is formed, the temperature at which said formulation is applied to said support and the temperature at which said formulation is dried after coating.

12. The process according to claim 10, wherein, after crosslinking said polymer with said functionalized polymer particles, crosslinking through the layer is homogeneous.

13. The process according to claim 1, wherein the ultrasound energy is generated by direct sonication horns and the power range is between 1 kW and 16 kW.

14. The process according to claim 1, wherein the ultrasound energy is generated by direct sonication horns and the frequency range is between 20 kHz and 30 kHz.

15. Process for preparing a pressure-sensitive adhesive, the process comprising the steps of:
producing a solvent-free pressure-sensitive adhesive formulation comprising a polymer, having reactive centers comprising functional groups Y, and functionalized polymeric particles, wherein the functionalized polymeric particles comprise at least one polymeric base unit, wherein the polymeric base unit is formed from monomers comprising monomers having functional groups Z which themselves do not react with functional groups Y, but which are configured to be converted to functional groups X which are reactable with functional groups Y, wherein the functionalized polymeric particles have particle diameters that are less than 100 nm,
converting, by supply of at least ultrasound energy, at least some of the functional groups Z of the functionalized polymeric particles of the solvent-free pressure-sensitive adhesive formulation into functional groups X which are capable of reacting with the functional groups Y of the polymer, wherein the ultrasound energy is supplied at a power range between 50 W and 16 kW and a frequency range from 20 kHz to 2 MHz; and
reacting the functional groups X of the functionalized polymeric particles with the functional groups Y of the polymer to crosslink said polymer with said functionalized polymeric particles,
wherein the functionalized polymeric particles are prepared by emulsion polymerization, miniemulsion polymerization or microemulsion polymerization, or by dispersion polymerization,
wherein the functionalized polymeric particles are present in a concentration range of 0.1% to 15% by weight based on the polymer.

* * * * *